US 7,756,933 B2

(12) United States Patent
Reshef et al.

(10) Patent No.: US 7,756,933 B2
(45) Date of Patent: Jul. 13, 2010

(54) SYSTEM AND METHOD FOR DETERRING ROGUE USERS FROM ATTACKING PROTECTED LEGITIMATE USERS

(75) Inventors: Eran Reshef, Herzliya Pituach (IL); Amir Hirsh, Herzliya Pituach (IL)

(73) Assignee: Collactive Ltd., Tel Aviv (IL)

( * ) Notice: Subject to any disclaimer, the term of this patent is extended or adjusted under 35 U.S.C. 154(b) by 1247 days.

(21) Appl. No.: 11/302,507

(22) Filed: Dec. 12, 2005

(65) Prior Publication Data

US 2006/0168202 A1 Jul. 27, 2006

Related U.S. Application Data

(60) Provisional application No. 60/635,802, filed on Dec. 13, 2004.

(51) Int. Cl.
*G06F 15/16* (2006.01)
(52) U.S. Cl. .......................... 709/206; 726/3
(58) Field of Classification Search .................. 709/206; 726/3
See application file for complete search history.

(56) References Cited

U.S. PATENT DOCUMENTS

| | | | |
|---|---|---|---|
| 6,023,723 A | 2/2000 | McCormick et al. | |
| 6,161,130 A | 12/2000 | Horvitz et al. | |
| 6,199,102 B1 | 3/2001 | Cobb | |
| 6,279,113 B1 | 8/2001 | Vaidya | |
| 6,330,590 B1 * | 12/2001 | Cotten | 709/206 |
| 6,357,008 B1 | 3/2002 | Nachenberg | |
| 6,393,465 B2 | 5/2002 | Leeds | |
| 6,408,391 B1 | 6/2002 | Huff et al. | |
| 6,643,686 B1 | 11/2003 | Hall | |
| 6,691,156 B1 | 2/2004 | Drummond | |
| 6,697,462 B2 | 2/2004 | Raymond | |
| 6,715,083 B1 | 3/2004 | Tovander | |
| 7,107,619 B2 | 9/2006 | Silverman | |
| 7,409,206 B2 * | 8/2008 | Bronstein | 455/415 |
| 7,472,163 B1 * | 12/2008 | Ben-Yoseph et al. | 709/206 |
| 7,540,021 B2 * | 5/2009 | Page | 726/6 |
| 7,620,690 B1 * | 11/2009 | Castelli | 709/206 |
| 7,640,322 B2 * | 12/2009 | Wendkos et al. | 709/219 |
| 7,668,951 B2 * | 2/2010 | Lund et al. | 709/223 |
| 7,676,566 B2 * | 3/2010 | Lund et al. | 709/223 |

(Continued)

OTHER PUBLICATIONS

The Spamhaus Project Organization, "About The Spamhaus Project", printed from the Internet on Feb. 11, 2010 from: http://www.spamhaus.org/organization/index.lasso.

*Primary Examiner*—Douglas B Blair
(74) *Attorney, Agent, or Firm*—Ettan Mehulal Law Group

(57) ABSTRACT

An active deterrence method and system deter rogue cyber activity targeting one or more protected legitimate users (PLUs). Methodologies and/or techniques are included to establish a PLU registry and/or enable a PLU to bear an identifying mark; detect rogue cyber activity; issue warnings to one or more rogue users (RUs) that target or attack PLUs with the detected rogue cyber activity; detect non-complying RUs that ignore or otherwise fail to comply with the warnings; and deploy one or more active deterrence mechanisms against the non-complying RUs. One active deterrence mechanism includes deploying a plurality of scripts to each PLU, and executing the scripts to issue complaints and request the non-complying RUs to clean their mailing lists of all PLUs. Other active deterrence mechanisms include alerting unaware business affiliates of the RUs, and notifying victims or law enforcement authorities of unlawful rogue cyber activity.

27 Claims, 12 Drawing Sheets

U.S. PATENT DOCUMENTS

| | | | |
|---|---|---|---|
| 7,680,890 B1* | 3/2010 | Lin | 709/206 |
| 2002/0073338 A1* | 6/2002 | Burrows et al. | 713/201 |
| 2003/0009698 A1 | 1/2003 | Lindeman et al. | |
| 2003/0233278 A1* | 12/2003 | Marshall | 705/14 |
| 2003/0236847 A1* | 12/2003 | Benowitz et al. | 709/206 |
| 2004/0003283 A1* | 1/2004 | Goodman et al. | 713/201 |
| 2004/0024718 A1* | 2/2004 | Adar et al. | 706/12 |
| 2004/0073617 A1 | 4/2004 | Milliken et al. | |
| 2004/0199595 A1* | 10/2004 | Banister et al. | 709/207 |
| 2004/0243844 A1* | 12/2004 | Adkins | 713/201 |
| 2004/0266413 A1* | 12/2004 | Bronstein | 455/415 |
| 2005/0021649 A1 | 1/2005 | Goodman et al. | |
| 2005/0080855 A1* | 4/2005 | Murray | 709/206 |
| 2005/0120019 A1* | 6/2005 | Rigoutsos et al. | 707/6 |
| 2005/0177599 A1* | 8/2005 | Goodman | 707/104.1 |
| 2005/0198177 A1* | 9/2005 | Black | 709/206 |
| 2006/0161989 A1 | 7/2006 | Reshef et al. | |
| 2006/0168017 A1* | 7/2006 | Stern et al. | 709/206 |
| 2006/0277259 A1 | 12/2006 | Murphy et al. | |
| 2007/0250644 A1* | 10/2007 | Lund et al. | 709/245 |
| 2007/0282952 A1* | 12/2007 | Lund et al. | 709/206 |
| 2008/0016167 A1* | 1/2008 | Lund et al. | 709/206 |
| 2008/0114884 A1* | 5/2008 | Hewes et al. | 709/229 |

\* cited by examiner

From: John Schultz (js@dev.example.com)
Subject: News: Accountant cashes in at poker tourney.
Newsgroups: rec.gambling.poker
Date: 2004-02-30 02:51:22 PST LAS VEGAS — The soft-spoken patent lawyer from Connecticut knew exactly what to do with his monstrous stack of chips at the final table of the 33rd annual World Series of Poker.

Fred "Fossilman" Redmond wielded it like a Flintstones club, knocking down opponent after opponent...

See the rest of this story at http://www.example.com/1325/235.htm

--
John Schultz
<js@dev.example.com>
Please do not send any unsolicited email to this address!

FIG. 4

Contact Us Now!

Name (first & last): ☐

Email address: ☐

Order number (optional): ☐

Subject: [Make a Selection ▼]

Please type in your question:
```
Your site has sent an email that
was deemed to be spam to a customer of
Blue Security. If this is a real
business opportunity, please email us at
error@bluesecurityinc.com. Otherwise,
please do not send any additional messages
to any domain or address
listed in Blue's registry
(www.bluesecurityinc.com/registry).
Thank you.
```

SYSTEM AND METHOD FOR DETERRING ROGUE USERS FROM ATTACKING PROTECTED LEGITIMATE USERS

CROSS-REFERENCE TO RELATED APPLICATIONS

The present application is based on, and claims priority and benefit from, U.S. Provisional Patent Application No. 60/635,802, filed on Dec. 13, 2004, which is incorporated herein by reference in its entirety. The present application is related to U.S. Patent application Ser. No. 11/302,508, filed on Dec. 12, 2005, titled "System and Method for Deterring Rogue Users from Attacking Protected Legitimate Users", published on Jul. 20, 2006 as United States Patent Application Publication Number 2006/0161989.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever

FIELD OF THE INVENTION

The present invention is directed to computer networks, and more particularly to a system and method for protecting network users from unwanted and potentially damaging attacks by rogue network users.

BACKGROUND OF THE INVENTION

Over the last few years, the Internet has turned from a friendly neighborhood into an extremely hazardous and unpleasant environment, due to a small percentage of rogue users. Those rogue users, such as criminals and greedy companies, abuse the Internet for their own purposes and cause ethical users inconvenience and trouble.

Rogue users are responsible for painful developments, such as email spam, spyware/adware, computer viruses, email scams, phishing, brand theft, hate sites, instant messaging spam, remote vulnerability exploitation, typo-squatting, search engine spam, and much more.

Legal and technological measures have failed to keep the Internet clean. Email spam is a well-known example. During 2003, the average American Internet user received over a hundred, fifty-five spam emails every week. Numerous laws (such as, the Controlling the Assault of Non-Solicited Pornography and Marketing (CAN-SPAM) Act of 2003, enacted on Jan. 1, 2004 as U.S. Public Law 109-187; 15 U.S.C. §§7701-7713, 18 U.S.C. §§1001, 1037; 28 U.S.C. §994; and 47 U.S.C. §227) have been enacted to halt this outraging abuse. Unfortunately, law enforcement is challenging due to the anonymous, rapidly changing and international nature of the Internet.

On the technology front, a growing number of anti-spam products attempt to passively defend users by filtering spam using a variety of technologies, such as probabilistic classification (see e.g., U.S. Pat. No. 6,161,130, entitled "Technique which Utilizes a Probabilistic Classifier to Detect 'Junk' E-mail by Automatically Updating a Training and Re-Training the Classifier Based on the Updated Training Set," by Horvitz et al.); repeated message identification (see e.g., U.S. Pat. No. 6,330,590, entitled "Preventing Delivery of Unwanted Bulk E-mail," by Cotton); sender address verification (U.S. Pat. No. 6,691,156, entitled "Method for Restricting Delivery of Unsolicited E-mail," by Drummond, et al.); fixed string matching (see e.g., U.S. Pat. No. 6,023,723, entitled "Method and System for Filtering Unwanted Junk E-mail Utilizing a Plurality of Filtering Mechanisms," by McCormick et al.); challenge-response mechanism (see e.g., U.S. Pat. No. 6,199,102, entitled "Method and System for Filtering Electronic Messages," by Cobb); black listing of spam senders (see the Spamhaus project available on the Internet at http://www.spamhaus.org/)

However, such anti-spam measures merely provoke spammers to invent new technologies for bypassing them, as evident from U.S. Pat. No. 6,643,686, entitled "System and Method for Counteracting Message Filtering," by Hall.

With more than 60% of the world's email traffic consisting of spam at the end of 2003, the spammers are clearly winning this arms race. It is interesting to note that the same kind of arms race exists with other forms of rogue online behavior, such as between virus writers and anti-virus vendors (see e.g., U.S. Pat. No. 6,357,008, entitled "Dynamic Heuristic Method for Detecting Computer Viruses Using Decryption Exploration and Evaluation Phases" by Nachenberg).

The constant battle between rogue users and filter vendors creates a cyclic process in every segment of the security market, in which the accuracy of a specific filtering technology diminishes as rogue users learn to bypass it. Filtering vendors then come up with new filtering schemes, which are resistant to current attack methods. These new filtering technologies are then released to the market and the cycle begins again.

Other kinds of technologies aim to make rogue behavior expensive by actually forcing rogue users to pay for each offense on a global basis (e.g., sending a spam email). Such a technology is presented in U.S. Pat. No. 6,697,462, entitled "System and Method for Discouraging Communications Considered Undesirable by Recipients," by Raymond. However, effective use of such technologies would require worldwide changes to the Internet infrastructure, which thereby renders them impractical.

Other kinds of efforts aim to actively drive all rogue users out of business and attempt to stop them from attacking any legitimate user. For example, these efforts involve voluntarily seeding the Internet with faked addresses. While serving a good purpose, such efforts always fail because when they do become effective enough, rogue users are forced to find a way to overcome them, as no other alternative is offered to them. For example, rogue users have adapted their address harvesting methods to avoid faked addresses. In addition, many of these suggested active techniques are illegal in nature.

Therefore, in order to offer a viable solution, it would be desirable if more active measures could be used to establish deterrence on a practical level. For example, it would be desirable to provide a means whereby protective measures asserted on behalf of a limited amount of legitimate users could establish a certainty in the minds of rogue users that (1) attacking those protected legitimate users will yield no profit; and (2) not attacking those protected legitimate users will allow rogue users to continue most of their rogue activities toward other, non-protected, legitimate users. Of course, should deterrence fail, it would be further desirable to provide a means whereby legitimate users could win decisively.

Deterrence is a well-observed behavior in nature. It is used in predator-prey situations as protective means for prey. A typical deterrence scheme in nature is warning coloration (also known as aposematic coloration). Such coloration is found among animals that have natural defenses that they use to deter or fend off predators. It is quite common among insects and amphibians. For example, the poison dart frogs are known for their unique coloration as well as the poison they secrete from their skin. They are among the most successful of tropical frogs although they have small geographical range. They have very few predators and for a good reason. When predators attempt to eat such frogs they realize that they are poisonous and promptly spit them out. Predators then avoid frogs with similar warning coloration on subsequent encounters.

Therefore, a need exists for systems and methods that reduce or eliminate rogue online activity by actively deterring rogue users, rather than passively protecting legitimate users.

BRIEF SUMMARY OF THE INVENTION

An active deterrence method and system are provided to deter rogue cyber activity targeting one or more protected legitimate users (PLUs). Methodologies and/or techniques are included to establish a PLU registry and/or enable a PLU to bear an identifying mark; detect rogue cyber activity; issue warnings to one or more rogue users (RUs) that target or attack PLUs with the detected rogue cyber activity; detect non-complying RUs that ignore or otherwise fail to comply with the warnings; and deploy one or more active deterrence mechanisms against the non-complying RUs.

The active deterrence method and system include one or more PLU registries, which are populated with a combination of real and artificial addresses in an encoded format. The real addresses represent the PLUs' actual communication descriptors (such as, email addresses, email domains, IP addresses, instant message addresses, or the like). The artificial addresses are associated with artificial PLUs. As such, the artificial addresses point to one or more computers, servers, or other communication devices being utilized to attract the RUs.

When they are included in the PLU registries, artificial addresses assist in concealing a PLUs' actual address. Also herein referred to as "trap addresses," the artificial addresses are seeded into the Internet (e.g., in Usenet) and harvested by RUs. Artificial addresses can also be made available to RUs while warning the RUs against using them. As such, artificial addresses can be used to "draw fire." Once RUs attack an artificial address, an active deterrence mechanism can be deployed to clean the RUs attack list of all PLUs.

The artificial addresses can also be used to gather statistics about rogue cyber activity. As such, some artificial addresses are not necessarily listed in the PLU registries since they are used for ongoing research.

To encode the PLU registries, the registry data is stored within the PLU registries in a blurry-hashed format. Blurry-hashing is implemented by limiting the number of bits in a hash representation of the registry data to cause a predetermined amount of collisions and produce a predefined probability of false matches. Fake hashes representing the artificial addresses can be added to the registry while maintaining the wanted false match probability. Changes in the registry to add or delete a real PLU address can be masked by comparable changes in the fake hashes.

Each registered value may be hashed in one of several known ways. This is done for example by publishing a list of suffixes and appending one of them to each value before hashing it. The use of several hashes allows changing which values generate false matches while still protecting the real values.

The PLU registries include a do-not-communicate registry, which lists PLUs that have expressed an interest in not receiving any communications from an RU. The PLU registries also include a do-not-damage registry, which lists PLU assets that RUs are using without proper authorizations. The PLU assets include brand names, customer bases, web sites, IP addresses or the like. The PLU registries can include a plurality of memberships depending on PLU preferences. For example, a subset of PLUs may opt to receive advertisements from specific classes of products (e.g., pharmaceuticals, financial products, etc.), while other PLUs may decide to opt-out of receiving any unsolicited advertisements.

An initial warning is provided manually or automatically to the RUs via email, web form, telephone number, fax number, or other available communication channels. For example, warnings can be provided within a communication protocol used between RUs and PLUs (such as, SMTP, HTTP or DNS) to identify the PLUs as being protected.

In addition to issuing a warning to the RUs, the active deterrence method and system also detect and warn all other involved entities (IEs) in a specific rogue cyber activity, while rejecting attempts by RUs to frame innocent bystanders as IEs. The IEs include the RU's business partners, such as hosting providers, credit card processing firms, live support firms, advertisement networks, or the like. A list of IEs is created by receiving and analyzing rogue advertisements (such as, email spam, spyware ads, search engine spam, and instant message spam), and extracting advertisers mentioned in those rogue advertisements.

To enable an RU to comply with the warnings, the PLU registries are integrated with a registry compliance tool can be executed to compare the RUs' mailing lists with an appropriate PLU registry, and remove all PLUs that are members of the PLU registry. If an RU or other IE fails to comply with the warnings, one or more active deterrence mechanisms are deployed.

One type of active deterrence mechanism includes a script or sequence of executable commands that are forwarded to the PLUs, and are executed to control the operations and/or functions of the PLUs to send a complaint to the RUs and other IEs. The complaint includes an opt-out request, and one complaint is sent from each RU for each act of rogue cyber activity directed against a PLU. Since most rogue cyber activities are bulk in nature, a substantial quantity of complaints is likely to be generated. The complaints can be sent to web forms, phone numbers, email addresses, and other communication channels of the IEs.

Commands can be executed to mimic the behavior of a human user to visit a web site owned by the IEs, and avoid being filtered out by the IE. The commands are executed to request and complete the appropriate web pages to complete the appropriate form to submit the complaint.

Commands are executed to make available the registry compliance tool to enable the RU to comply with the terms of the complaint. The RU is advised to download and execute the registry compliance tool to remove all PLUs from the RU's mailing list.

Another active deterrence mechanism can include executable commands to establish a dialog with the IEs. A human operator can also establish a dialog. One dialog is held for each act of rogue cyber activity directed against a PLU. Since most rogue cyber activities are bulk in nature, a substantial quantity of dialogs is likely to be generated. Dialogs can be implemented via instant messaging, chat facilities, phone numbers, email addresses, and other communication channels of the IEs.

Another active deterrence mechanism can include a direct communication channel with the PLUs and other Internet users to warn the users of a known IE's rogue cyber activity (e.g., when a user receives spam or the user's computer has become an unwilling IE). The commands can also include a mechanism to communicate information with competing, but reputable, companies, or communicate information with a PLU about competing, but reputable, products or services.

Another active deterrence mechanism can include methodologies and/or techniques for detecting partners of IEs that are unaware of the rogue cyber activity. These partners can be recommended to terminate their relationship with the rogue IEs.

Another active deterrence mechanism can include methodologies and/or techniques for detecting unlawful rogue cyber activity, and alerting the victim, appropriate law enforcement agencies, or other authorities, including filtering vendors and the general public.

Another active deterrence mechanism can include methodologies and/or techniques for offering enforceable PLU registries and/or identifying marks to national and international authorities. Means can be provided for managing the PLU registries and/or identifying marks, detecting rogue cyber activity aimed at PLUs appearing in PLU registries and/or displaying identifying marks, and actively deterring RUs and warning the RUs from future attacks on PLUs.

The active deterrence method and system include a distributed network of multiple computing devices and/or applications that can be controlled to act against detected IEs. The active deterrence commands can be executed on the multiple computing devices, which belong to different PLUs, to utilize a portion of their computing resources and network bandwidth to create a distributed computing platform that takes action against the IEs and executes one or more active deterrence mechanisms. Each computing device may take action only against IEs that actually attacked the associated PLU, take action against IEs that attacked any PLU, or take action against any IE.

Alternatively or in addition, the active deterrence method and system includes a centrally controlled device or devices for executing one or more active deterrence mechanisms. For example, PLUs may report their spam to a central server, where additional analysis is performed to detect IEs, while the sending of opt-out requests is done by each PLU in a distributed fashion.

The active deterrence method and system can be offered to consumers on a subscription basis. For example, an active deterrence subscription can be provided to companies aiming to protect their employees from spyware infections. As another example, a subscription can be provided to consumers to protect personal email addresses from spam by adding the addresses to a registry honored by spammers. As another example, a subscription can be provided to offer search engine protection to protect against illegal modification of search results by a spyware running on PLU machines.

Other business model and technical aspects would become apparent to those skilled in the relevant art(s) in view of the teachings of the present disclosure. Additional aspects of the present invention would be apparent in view of the description that follows.

BRIEF DESCRIPTION OF THE DRAWINGS

The foregoing and other aspects of the invention will become more apparent from the following description of illustrative embodiments thereof and the accompanying drawings, which illustrate, by way of example, the principles of the invention. In the drawings:

FIG. 4 illustrates an example of email address seeding;

FIG. 7 illustrates active deterrence in the form of a complaint to a rogue advertiser;

DETAILED DESCRIPTION OF ILLUSTRATIVE EMBODIMENTS

The present invention will now be described in detail with reference to the drawings, which are provided as illustrative examples of the invention so as to enable those skilled in the relevant art(s) to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Active Deterrence System Overview

Figure 1:
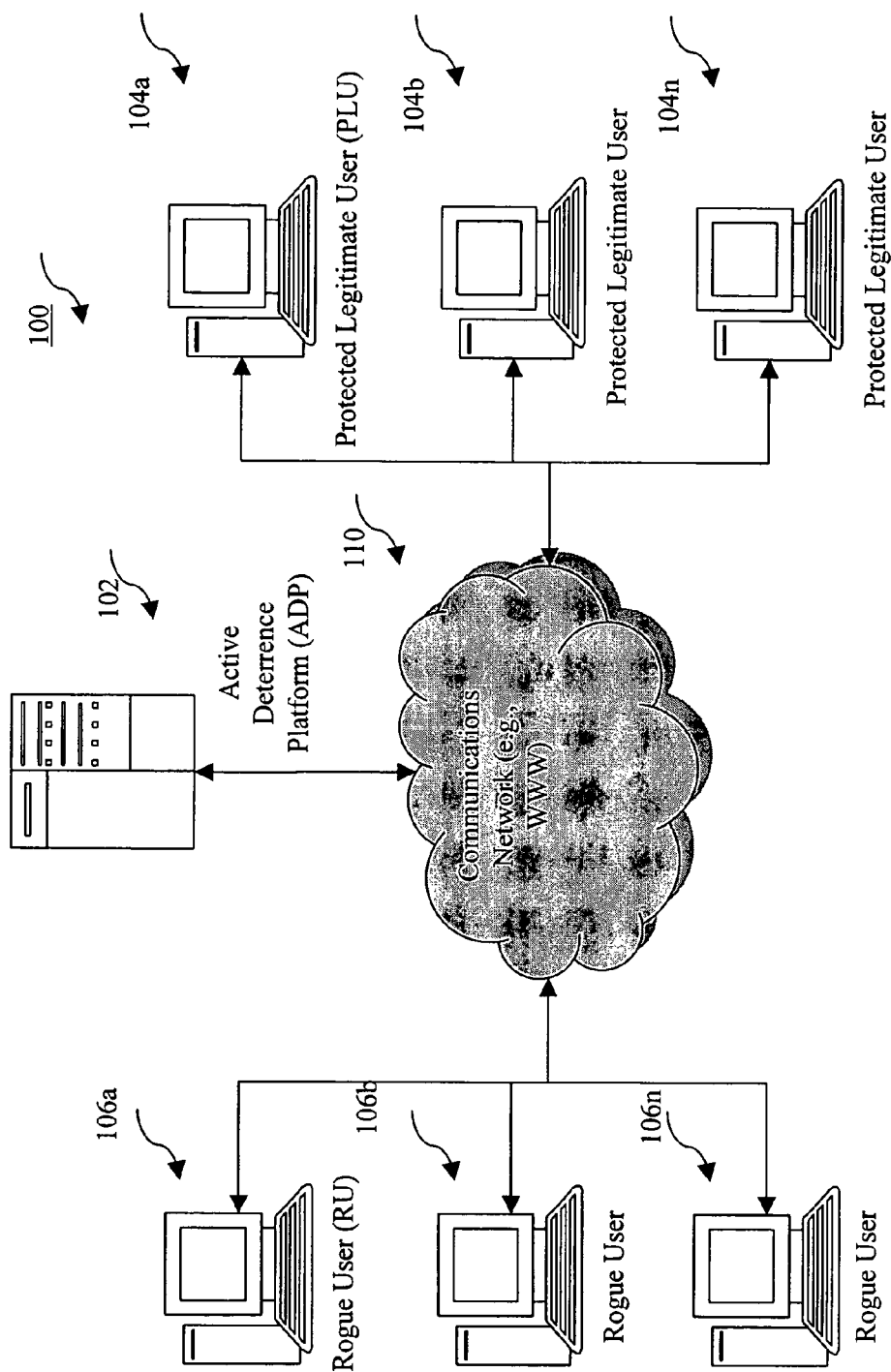
FIG. 1 illustrates an active deterrence system.

FIG. 1 illustrates an active deterrence system 100 that includes an active deterrence platform (ADP) 102, a plurality of protected legitimate users (PLUs) 104a-104n, a plurality of rogue users (RUs) 106a-106n, and a communications network 110. Active deterrence system 100 is configured to deter one or more RUs 106a-106n from engaging in rogue cyber activity targeting one or more PLUs 104a- 104n.

PLUs 104a-104n and RUs 106a-106n can be a wired and/or wireless personal computer, personal digital assistant (PDA), enhanced telephone, personal television, or other data processing device linked to communications network 110. As a personal computer, PLUs 104a-104n and RUs 106a-106n can be a desktop, notebook, notepad, or the like. As such, a human operator would utilize a PLU 104a-104n or RU 106a-

106n device or application to exchange communications over communications network 110.

As explained in greater detail below, ADP 102 provides an operations center that includes a combination of manual and automated methodologies and/or techniques that are executed to deter RUs 106a-106n and ensure that PLUs 104a-104n can be avoided. ADP 102 can be implemented to issue a warning to RUs 106a-106n that target or are already attacking PLUs 106a-106n. The warning is issued to unambiguously request the involved RUs 106a-106n to cease future electronic communications with non-consenting PLUs 104a-104n, and to notify the involved RUs 106a-106n that continued communications would trigger one or more active deterrence mechanisms of ADP 102. ADP 102 can be further implemented to detect RUs 106a-106n that ignore or otherwise circumvent the warning, and thereafter execute one or more active deterrence mechanisms only against those non-complying RUs 106a-106n. Therefore, the warning represents an initial request to opt-out or unsubscribe from the communications of RUs 106a-106n. The active deterrence mechanisms are deployed to re-emphasize and/or enforce the initial request by, for example, sending additional opt-out requests, complaining to an appropriate authority (e.g., the U.S. Food and Drug Administration (FDA), the U.S. Securities and Exchange Commission (SEC), the U.S. Federal Bureau of Investigation (FBI), anti-spam vendors, black-list maintainers, anti-virus vendors, an ISP abuse representative, or the like), and protecting the assets of non-consenting PLUs 104a-104n from subsequent unwanted solicitations. Consenting PLUs 104a-104n may indicate to ADP 102 that certain types are solicitations are acceptable (e.g., spam advertisements relating to financial products, medications, etc.)

ADP 102 can be implemented via one or more servers, with each server being one or more computers providing various shared resources with each other and to other system components. The shared resources include files for programs, web pages, databases and libraries; output devices, such as, printers, plotters, display monitors and facsimile machines; communications devices, such as modems and Internet access facilities; and other peripherals such as scanners, or the like. The communications devices can support wired or wireless communications, including satellite, terrestrial (fiber optic, copper, coaxial, and the like), radio, microwave, free-space optics, and/or any other form or method of transmission.

The server hosting ADP 102 can be configured to support the standard Internet Protocol (IP) developed to govern communications over public and private Internet backbones. The protocol is defined in Internet Standard (STD) 5, Request for Comments (RFC) 791 (Internet Architecture Board). The server also supports transport protocols, such as, Transmission Control Protocol (TCP), User Datagram Protocol (UDP), Real Time Transport Protocol (RTP), or Resource Reservation Protocol (RSVP). The transport protocols support various types of data transmission standards, such as File Transfer Protocol (FTP), Hypertext Transfer Protocol (HTTP), Simple Network Management Protocol (SNMP), Network Time Protocol (NTP), or the like.

Communications network 10 provides a transmission medium for communicating among the system components. Communications network 110 includes a wired and/or wireless local area network (LAN), wide area network (WAN), or metropolitan area network (MAN), such as an organization's intranet, a local internet, the global-based Internet (including the World Wide Web (WWW)), an extranet, a virtual private network, licensed wireless telecommunications spectrum for digital cell (including CDMA, TDMA, GSM, EDGE, GPRS, CDMA2000, WCDMA FDD and/or TDD or TD-SCDMA technologies), or the like. Communications network 110 includes wired, wireless, or both transmission media, including satellite, terrestrial (e.g., fiber optic, copper, UTP, STP, coaxial, hybrid fiber-coaxial (HFC), or the like), radio, free-space optics, microwave, and/or any other form or method of transmission.

Active deterrence system 100 can be configured to identify PLUs 104a-104n having no interest in the products and/or services being promoted by RUs 106a-106n and other advertisers. As a result, such advertisers (including RUs 106a-106n) may restructure their marketing strategies to target only network users (including consenting PLUs 104a-104n) having an interest in their products and/or services and thereby, maximize profit-making opportunities. A natural consequence of the advertisers' continuing to ignore the warnings of system 100 and continuing to direct rogue cyber activities toward PLUs 104a-104n would be an avoidable detriment to their economic profits.

Active Deterrence Platform (ADP) Overview

Figure 2:
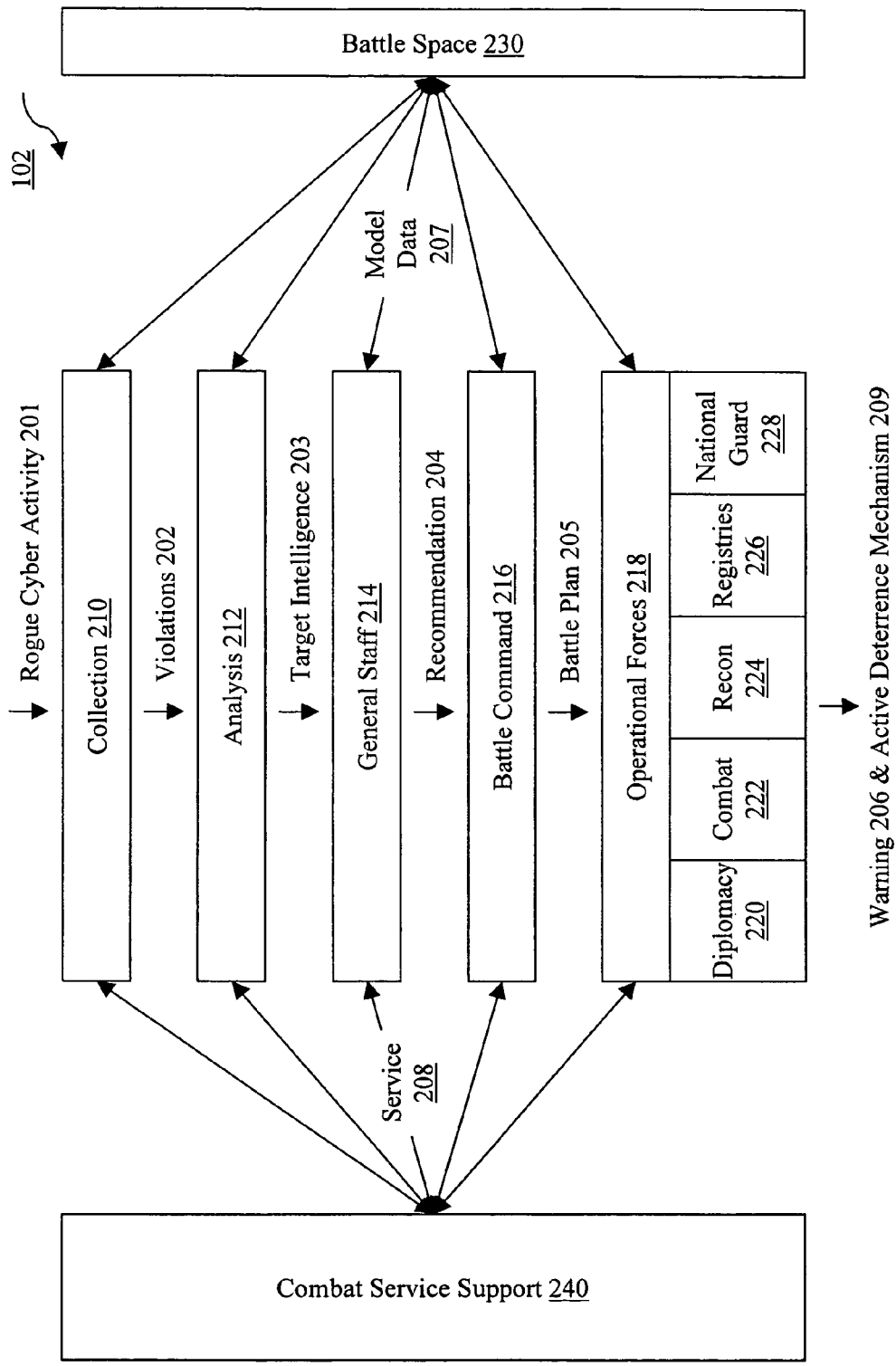
FIG. 2 illustrates the components of an active deterrence platform (ADP) and its internal data flow.

FIG. 2 illustrates an embodiment of ADP 102, which resembles a virtual army, drawing many of its concepts and guidelines from an already-proven model of army organization and procedures. However, the present invention is not implicitly or explicitly limited to such a model, and various alternative models and organizations would become apparent to those skilled in the relevant art(s) after being taught by the present example. The components of FIG. 2 can be implemented using a combination of computer hardware, firmware, and software, using engineering design techniques and network protocols that are guided by the principles of the present invention as would become apparent from the detailed descriptions herein. For example, all components can be implemented as software components running on top of standard personal computers running the Windows® operating systems available from Microsoft Corporation (Redmond, Wash).

The components of ADP 102 include a Collection subsystem 210, an Analysis subsystem 212, a General Staff subsystem 214, a Battle Command subsystem 216, a plurality of Operational Forces subsystems 218, a Battle Space subsystem 230, and a Customer Services Support subsystem 240. Operational Forces subsystems 218 include a Diplomacy subsystem 220, a Combat subsystem 222, a Reconnaissance subsystem 224, a Registries subsystem 226, and a National Guard subsystem 228.

Collection subsystem 210 accesses information about rogue cyber activity 201 directed at PLUs 104a-104n. Collection subsystem 210 can access the information via manual and/or automated processes, while the rogue cyber activities 201 are occurring or after the fact. For example, a user of a PLU 104a-104n can report rogue cyber activity 201 to Collection subsystem 210. Collection subsystem can also access rogue cyber activity 201 independently of affirmative acts from a user of PLU 104a-104n.

To accomplish its mission, Collection subsystem 210 performs one or more of the following three tasks: seeds artificial PLUs, accesses rogue cyber activity 201, and parses the rogue cyber activity 201 into a registry violation 202. With regards to the task of artificial PLU seeding, Collection subsystem 210 can be executed to seed the Internet (e.g., communications network 110) with artificial email addresses that are pointing to an ADP server and that are listed in a violation registry (referred to herein as a "PLU registry"). The artificial email addresses can be derived from an actual or real address of a PLU 104a-104n, or the artificial email addresses can be generated independently of the PLUs 104a-104n. The artificial email addresses are associated with the ADP server (also referred to herein as an "artificial PLU") that has been established to receive solicitations from RUs 106a-106n. Therefore upon creation, the artificial addresses are seeded over the Internet and harvested by RUs 106a-106n for solicitations.

The artificial addresses can be used to lure spam or other rogue cyber activity 201 for research purpose and/or establish active deterrence against RUs 106a-106n. To establish active deterrence, the artificial addresses are added to a PLU registry, as described in greater detail below.

With respect to the second task, Collection subsystem 210 accesses rogue cyber activity 201 either from a PLU 104a-104n or from the ADP server. For example, one or more SMTP-enabled ADP servers can be established to receive spam messages from artificial and/or real PLUs 104a-104n. A spam filter can be installed on a PLU 104a-104n to collect unsolicited emails targeting real addresses and forward the emails to an ADP server. Artificial addresses pointing to an ADP server can be used to collect unsolicited emails targeting the artificial addresses. Collection subsystem 210 can query one or more the ADP servers to receive and/or generate reports regarding the RU solicitations.

Regarding the third task, Collection subsystem 210 parses rogue cyber activity 201 into a registry violation 202. Collection subsystem 210 translates raw data collected from the rogue cyber activity 201 into normalized violations 202. After normalizing the collected activity data, Collection subsystem 210 passes the normalized violations 202 onto Analysis subsystem 212 and/or loads it into Battle Space subsystem 230, which provides a real-time model 207 of the battle environment.

Since Collection subsystem 210 has constant touch points with attackers (e.g., RUs 106a-106n), this provides ample opportunity for ad-hoc, real-time combat (i.e., "inline combat" via Combat subsystem 222) and seeding (i.e., "inline seeding" via Reconnaissance subsystem 226). Examples of such opportunities include tar pitting, sending ADP servers or other communications devices, and seeding email addresses as a response to dictionary attacks. Dictionary attacks occur with RUs 106a-106n combine names, letters, and/or numbers into multiple permutations to derived email addresses and construct an Attack List of email addresses.

Analysis subsystem 212 reviews an incoming violation 202 to identify an RU 106a-106n and determine its formation. Analysis subsystem 212 extracts all involved entities (IEs) out of the normalized violations 202 while rejecting attempts by RUs 106a-106n to frame innocent bystanders as IEs. For example, Analysis subsystem 212 can create a list of IEs by receiving and analyzing rogue advertisements (such as, email spam, spyware ads, search engine spam, instant message spam, or the like) and extracting the advertisers mentioned in those rogue advertisements. Analysis subsystem 212 can create a list of IEs by detecting computers that communicate with artificial addresses developed to attract rogue cyber activities, and by logging the communication attempts. These computers are part of an infrastructure for rogue cyber activities, such as zombie web sites that distribute Trojans, open proxies, and client zombies (computers under control of a worm).

Analysis subsystem 212 can also create a list of IEs by detecting the business partners of previously detected IEs. The business partners can include hosting providers, credit card processing firms, live support firms, advertisement networks, Internet registrars, e-commerce solution providers, or the like. Detection can be carried out by analyzing all available data on a previously detected IE. For example, this can be achieved by collecting all HTML pages from an IE that is a web site and looking for links to its partners, or using TCP/IP exploration tools (e.g., traceroute, whois, ping) to detect its hosting provider.

Analysis subsystem 212 can also create a list of IEs from external sources, such as anti-spam vendors, blacklist maintainers, anti-virus vendors, or the like. Moreover, Analysis subsystem 212 can create a list of IEs by actively seeking out companies or individuals engaged in rogue cyber activities 201 that damage PLUs 104a-104n, such as the distribution of stolen software (i.e., warez) of PLUs 104a-104n, and online scams related to PLUs 104a-104n. For example, using search engines to find web sites that advertise the products PLUs 104a-104n without their permission.

The extracted IEs include the operators, hosts, or owners of RUs 106a-106n, and can be classified as being a cooperative or complying IE (i.e., willing to cease its role in the rogue cyber activity 201) or as being a hostile or non-complying IE or Enemy (i.e., not willing to cease its role in the rogue cyber activity 201). The output of Analysis subsystem 212 is target intelligence 203, which can be grouped by Enemies. Analysis subsystem 212 utilizes two major subsystems to achieve this mission: a Temporary Enemies Creator subsystem and an Enemy Unifier subsystem.

The Temporary Enemies Creator subsystem analyzes an incoming violation 202 and identifies the type of violation. It also identifies all recognized parties behind the incoming violation 202. All the analysis is done on the data already within Battle Space subsystem 230. No active steps to retrieve more information are required at this point. However in alternate embodiments, supplemental information can be obtained from other sources.

Temporary Enemies Creator subsystem produces, within Battle Space subsystem 230, temporary entities of the enemy and its related entities. Such entities can include a Spammer, an Advertiser's URL, a Zombie used by the Spammer, or the like. Battle Space subsystem 230 holds all information received regarding the identified Enemy and related entities.

Analysis subsystem 212 also includes an Enemy Unifier subsystem, which analyzes all newly created temporary enemies and compares them to existing known Enemies from the past. The Enemy Unifier subsystem either creates a new Enemy or updates an existing one with the new data that has arrived (e.g., link the Enemy to newly received violations 202). Additionally, the results of successful Reconnaissance (via Reconnaissance subsystem 224 that gathers more intelligence about an Enemy, and which is described in greater detail below) are analyzed and entities in Battle Space subsystem 230 are updated accordingly. Analysis subsystem 212 also takes into account any countermeasures (such as email obfuscation, URL obfuscation, or the like) that are used by RUs 106a-106n to resist reconnaissance and/or analysis.

There can be several correlating factors upon which all parts of the Enemies are unified into a single one. For example if a single spammer uses ten different URLs in its spam message, the spammer would initially appear to be ten separate RUs 106a-106n. A reconnaissance operation on all ten URLs would uncover the fact that all of the URLs essentially point to the web site of the same advertiser, thus Enemy Unifier subsystem to unify the ten RUs 106a-106n into a single RU 106a-106n.

Battle Space subsystem 230 includes a data model 207 of the environment, factors, and conditions, which must be understood to successfully deter an RU 106a-106n. The status of all assets and actions involved are available and can be used in order to make a well-informed decision. The information stored in Battle Space subsystem 230 includes Enemy entities, ADP entities, Event entities, Partner entities, and Terrain entities.

Enemy entities include IP addresses that are spreading viruses. ADP entities include an SMTP receiving server. Event entities include the time and date of an Enemy attack, as well as information indicating that Enemy attacks are continuing after an active deterrence mechanism 209 has been deployed. Partner entities include an Internet Service Provider (ISP)'s abuse team. Terrain entities include a listing of the major ISPs around the world.

In an embodiment, Battle Space subsystem 230 can be implemented by a combination of database schema for storing the data and a set of management tools for maintaining their values and handling all tasks involved in keeping the data current, accurate, and representative of the relevant population.

General Staff subsystem 214 provides centralized control for planning the battle against rogue cyber activity 201. General Staff subsystem 214 examines the present situation and the developments that have led to a current state. General Staff subsystem 214 suggests multiple courses of action, recommends the best course of action for implementation, and presents the recommendation 204 to Battle Command subsystem 216.

In an embodiment, General Staff subsystem 214 comprises two major components: an expert system and an optimizer. The expert system drives the planning processes by pursuing and measuring reduction in rogue cyber activity 201 against PLUs 104a-104n, while taking care of legality and legitimacy of actions. The expert system also decides and prioritizes which targets to deter and what type of action to take against each target. The expert system sets the target priorities and operational constraints.

The optimizer generates an optimal recommendation 204 based on the output from the expert system. The optimizer maximizes the impact of the recommendation 204 while minimizing costs and risk exposure. For example, the optimizer may recommend actions to synchronize an ADP server and advertiser actions against the most active enemy for a maximum effect.

Battle Command subsystem 216 represents the command center used by ADP analysts for directing, coordinating, and controlling operational forces. After General Staff subsystem 214 has planned the battle, Battle Command subsystem 216 presents the recommendation 204 to a human analyst (herein referred to as "Battle Command analyst") along with all the means needed to check the recommendation 204, validate the target (i.e., safety checks), and then either employ an active deterrence mechanism as an approved battle plan 205 or modify the target. By validating the target, the Battle Command analyst ensures that any deployed active deterrence mechanisms (including warnings, complaints, opt-out requests, etc.) are directed at legitimate sites or businesses, and that "Joe jobs" would not invoke active deterrence at innocent third parties. As part of team of experts, the Battle Command analyst may use white lists, blacklists, Internet searches, ADP server reports on rogue cyber activity 201, or the like, to manually verify the IEs and recommendations 204.

An RU 106a-106n may attempt to circumvent system 100 by changing its email address, IP address, domain name, or like. As such, the RU 106a-106n may attempt to avoid being detected as being listed on a blacklist or as a repeat offender. The Battle Command analyst, however, detects repeat offenders by evaluating the IEs determined to have targeted a PLU 104a-104n. Therefore, ADP 102 does not need to maintain a record of which RUs 106a-106n have sent spam, for example, to a PLU 104a-104n. By evaluating the IEs, the Battle Command analyst is able to more accurately determine if an RU 106a-106n is attempting to conceal its identity by, for example, changing IP addresses or domain names. If the same IEs are involved in multiple acts of rogue cyber activity 201 against the same PLU 104a-104n, the affiliated RU 106a-106n is likely to be a repeat offender.

In addition to determining if an RU 106a-106n is affiliated with an IE that is a repeat offender, the Battle Command analyst (and/or software routines) can evaluate demographic, behavioral, or psychographic data to detect repeat offenders or confirm that the source of the rogue cyber activity 201 is, in fact, an RU 106a-106n. For example, geographic addresses, telephone numbers, IP addresses, identical or substantially similar content within a message, timing of electronic transmissions, or the like can be used to detect or confirm rogue or repeat offenders.

The Battle Command subsystem 216 includes a graphical user interface (GUI) whose screens provide the analysts with multiple views into the recommendations 204 of General Staff subsystem 214, such as an inter-enemy view, intra-enemy view, combat-unit view, and target-type view.

Operational Forces subsystem 218 includes a plurality of additional subsystems or forces whose primary missions are to actively deter subsequent rogue cyber activity 201. The input to Operational Forces subsystem 218 is a set of commands (i.e., battle plan 205) from Battle Command subsystem 216. The battle plan 205 is developed to initially issue a warning 206 to RUs 106a-106n, and if the warning 206 fails, implement an active deterrence mechanism 209.

Referring back to FIG. 2, battle plan 205 can be executed by the following components: Diplomacy subsystem 220, Combat subsystem 222, Reconnaissance subsystem 224, Registries subsystem 226, and National Guard subsystem 228.

Diplomacy subsystem 220 includes diplomacy units that are used to issue a warning 206 to the IEs, including the RUs 106a-106n and their partners. The warning 206 can include sending to an unwary partner a periodic report about the RUs 106a-106n. For example, when a spam-advertised web site is detected to be an affiliate of the web site "example.com," the owner or host of "example.com" is alerted.

Warnings 206 can be issued to RUs 106a-106 already attacking PLUs 104a-104n and to RUs attempting or considering to attack PLUs 104a-104n. For example with respect to RUs 106a-106n already attacking PLUs 104a-104n, warnings 206 can be issued manually and/or automatically to the RUs 106a-106n and their business partners via email, web form, telephone number, fax number, or any other available communication channel. RUs 106a-106n and/or their business partners may choose to cancel any on-going attacks on PLUs 104a-104n and immediately avoid active deterrence (i.e., deployment of active deterrence mechanism 209). For example, a hosting provider of a web site that infects PLUs 104a-104n with spyware may choose to close the site, signaling its willingness to cancel ongoing attacks on PLUs 104a-104n, and avoid the execution of active deterrence mechanism 209.

With respect to RUs 106a-106n already attacking or considering attacking PLUs 104a-104n, warnings 206 can be embedded within the communication protocol (e.g., as SMTP, HTTP, DNS, or the like) used between RUs 106a-106n and PLUs 104a-104n that identifies PLUs 104a-104n to RUs 106a-106n as protected (i.e., marking PLUs 104a-104n with a special identifying mark). For example, when a PLU 104a-104n communicates with a spyware-infecting site, the PLU 104a-104n can transmit a specially crafted HTTP header identifying the PLU 104a-104n as being protected.

Combat subsystem 222 includes combat units in charge of the atomic actions that are targeting a specific Enemy's target. Each combat unit includes a script or a sequence of executable commands that, when executed, controls an operation and/or a function of a computer to perform one or more atomic actions that are specifically tailored to respond to the rogue cyber activities 201. For example, a combat unit can be developed to submit a complaint or opt-out request on a web site involved with the rogue cyber activity 201. Commands are executed to post the complaint in a manner that mimics the behavior of a human user operating a web browser to visit the web site. For instance, commands can be executed to open an HTTP browsing session with the web site, send one or more requests for specific HTML pages, and enter the appropriate text on forms (e.g., opt-out forms, complaint forms, registration forms, purchase forms, etc.) found on the HTML pages. The text includes a request to cease communications with non-consenting PLUs 104a-104n.

To further mimic a human user operating a web browser, commands can be executed to pause for a predetermined period of time between HTML requests. Requests for several images can be sent in parallel, which also mimic a human user walking through a web site. In addition, commands can be executed to request a random number of unique pages. This technique is useful for advanced spammers that generate dynamic sites having the capability to filter out a user sending predictable requests.

Commands can also be executed to request the web site owner to download a registry compliance tool, which can be executed to clean the mailing list (i.e., Attack List) of the site owner and remove all protected addresses listed therein.

The commands also include security mechanisms to prevent a RU 106a-106n from changing the involved web site such that complaints are posted at a web site affiliated with an innocent third party. For example, a list of IP addresses for posting complaints can be included with the commands. Therefore if the site code for the involved web site changes or if the sites' DNS entries are altered in an attempt to redirect the executed commands, the HTTP session would terminate.

The combat units can be forwarded to the PLUs 104a-104n for installation and execution. Alternatively, the combat units can be sent to another data processing device that is under the control of ADP 102 (such as an ADP server) and that installs and executes the combat units.

The combat units are programmed for executing one or more active deterrence mechanisms 209. For example, the combat units may send a complaint or opt-out request for each email spam that has been received by a PLU 104a-104n to the advertiser detected from the spam. In an embodiment, the combat units of Combat subsystem 222 are executed to send one or more complaints (e.g., complaint 612) for each rogue cyber activity 201 attacking on particular PLU 104a-104n (e.g., sending one opt-out request to an advertiser using spam for each spam message received, as allowed under the Controlling the Assault of Non-Solicited Pornography and Marketing (CAN-SPAM) Act of 2003, enacted on Jan. 1, 2004 as U.S. Public Law 109-187; 15 U.S.C. §§7701-7713, 18 U.S.C. §§1001, 1037; 28 U.S.C. §994; and 47 U.S.C. §227). For example, a targeted PLU 104a-104n can send a single complaint in response to a single rogue cyber activity 201 to opt-out of receiving further correspondence from the RU 106a-106n. Additionally, each member of the community of PLUs 104a-104n can also send a single complaint in response to each rogue cyber activity 201 directed at the targeted PLU 104a-104n. Since most rogue cyber activities 201 are bulk in nature, a substantial amount of complaints would most likely be generated. The complaints can be sent to web forms, phone numbers, email addresses, or any other communication channel of the IE. Since most IEs assume a low number of complaints, the overall overhead for dealing with complaints would most likely need to be increased so that the IE can invest in additional infrastructure.

In another embodiment, the combat units are executed to establish a dialog with the IEs. One dialog can be held for each rogue cyber activity 201 (e.g., spam message) on PLUs 104a-104n. Since most rogue activities are bulk in nature, a substantial quantity of dialogs would most likely be initiated. Dialogs can be implemented via instant messaging, chat facilities, phone numbers, email addresses, or any other communication channel of the IE. For example, an advertiser using a spyware can be asked different questions about its offered goods. Since most IEs assume a low number of questions from prospects, the overall overhead of dealing with those questions would most likely need to be increased so that the IE can invest in additional infrastructure.

In another embodiment, the combat units are executed to visit the web sites of the IEs, avoid being filtered out by the IEs, and mimic the behavior of a regular customer. Instructions are executed to walk in areas of the related web sites at least once for each rogue cyber activity 201 directed at a PLU 104a-104n (e.g., automatically visiting an advertised web site once per advertisement displayed by a spyware and generating a report for the PLU 104a-104n who received the advertisement). Since most rogue cyber activities 201 are bulk in nature, a substantial quantity of visits is likely to occur. Since most IEs assume a low number of visits, the overall overhead for dealing with the visits is likely to need increasing so that the IE can invest in additional infrastructure.

In an embodiment, the combat units are executed to warn an Internet user whenever an attempt to use or view a known IE is made by the user, or whenever the Internet users' computer or other processing device unwillingly becomes an IE (e.g., a machine which is a spam sending zombie). The combat units can also display information with competing, but reputable, companies, or display information to PLUs 104a-104n about competing, but reputable, products or services. This form of active deterrence mechanism 209 reduces or eliminates the ability of an RU 106a-106n to generate revenues from its wrongdoings.

In another embodiment, the combat units are executed to detect the partners of an RU 106a-106n who are unaware of the rogue cyber activity 201. The combat units would also alert the partners to terminate their relationship with the RU 106a-106n. For example, when a spam advertised web site is detected to be an affiliate of a reputable business such as Example.com, Example.com is alerted and is likely to terminate its relationship with the offending site.

In another embodiment, the combat units are executed to detect IEs taking advantage of legitimate businesses without their knowledge, and alert these legitimate businesses. For example, when an unauthorized zombie is detected within the network of a reputable business such as Acme, Inc., Acme, Inc. is alerted and is likely to terminate the zombie.

In another embodiment, the combat units are executed to detect illegal actions of IEs and alert law enforcement agencies to act against the IEs. For example, a web site spreading computer viruses can be reported to the FBI.

In another embodiment, the combat units are executed to detect illegal actions of IEs and alert the victims to act against the IEs. For example, a web site using a faked web seal can be reported to the company that is certifying sites for this web seal.

In another embodiment, the combat units are executed to legitimately disable or take control over the IE by, for example, exploiting a detected vulnerability in the IE's communications system to restrict communications with the PLUs 104a-104n. In another embodiment, the combat units are executed to deny access to the PLUs 104a-104n. For example, when open SMTP relays (or proxies) are used as part of a spam operation (as described in greater detail below with reference to FIG. 9), a sequence of instructions can be executed to command the open relays to send messages to one another in a loop using variable DNS replies. As a result, the RUs 106a-106n may exhaust its own resources, the resources of its partners, or the resources of other spammers (i.e., depending on the owner of the open SMTP relays). In other words, the RUs 106a-106n may be sending spam messages to itself or to other spammers.

In another embodiment, the combat units are executed to publish the IEs' information to interested parties (e.g., filtering vendors) or to the general public, making those vendors' customers reject IE's rogue cyber activity 201. For example, a list of spam advertised web sites can be published to corporate URL filters, causing many companies around the world prevent their users from visiting those sites.

In another embodiment, the combat units are executed to implement a communication protocol between PLUs 104a-104n and IEs in an RFC-complaint, yet non-standard format, to disrupt the IEs' ability to communicate with the PLUs 104a-104n. Because IEs expect standard implementations, the IEs are not likely to anticipate the disruption. For example, these methods can involve implementing an SMTP server that sends RFC-complaint, yet non standard, large amounts of data during the initial handshake, causing disruption to rogue mail servers.

In another embodiment, the combat units are executed to legally modify automated business statistics. For example, spammers are sometimes compensated for customers who visited the site those spammers advertised, and the number of customers is measured automatically using special URLs embedded in spam messages. By visiting large amounts of those special URLs collected from spam messages that were sent to PLUs 104a-104n, the spammer's business model would be skewed.

It should be understood that the active deterrence method and system described herein (including, without limitation, system 100, warnings 206, and active deterrence mechanisms 209) must be implemented in compliance with all governing laws and regulations. Such laws and regulations include, but are not limited to, any applicable law pertaining to distributed denial of service activities, false or misleading header information, deceptive subject lines, dictionary attacks for generating email addresses, registering multiple email addresses for commercial purposes, unauthorized use of open relays or open proxies, unauthorized use of third party computers, using relays or multiple email addresses to deceive or mislead recipients, falsifying the identity of a registrant of email accounts or domain names, or the like.

Reconnaissance subsystem 224 actively collects data about RUs 106a-106n and other involved entities (IEs). For example, Reconnaissance subsystem 224 can walk a web site and extract all communication methods (e.g., contact us forms, phone numbers, etc), while overcoming any efforts by RUs 106a-106n to obscure this information.

Registries subsystem 226 includes one or more PLU registries that identify the PLUs 104a-104n, any specified PLU preferences, and PLU communication methods and assets. The PLU registries can be kept in an encoded format, along with registry compliance tools allowing RUs 106a-106n to clean their mailing list or "Attack list" for sending unsolicited electronic communications. The PLU registry compliance tools enable RUs 106a-106n to quickly remove any PLU 104a-104n from their Attack lists. For example, a computer program can be provided to RUs 106a-106n for downloading a machine readable, encoded registry from a public web site, comparing the registry with their Attack lists, and generating a version of their Attack lists without PLUs 104a-104n.

The PLU registries can include a do-not-communicate registry of communication descriptors (e.g., email addresses, email domains, IP addresses, and instant message addresses, or the like) of PLUs 104a-104n. The do-not-communicate registry can be secured by storing the registry data in a blurry-hashed format. Blurry-hashing is implemented by limiting the number of bits in a hash causing a predetermined amount of collisions. In an embodiment, blurry-hashing is implemented by using a hash function to calculate, for example, 128-bit values for the email addresses in a PLU registry. The output is trimmed to a shorter sequence (e.g., 30-bits). A large number of random 30-bit values (i.e., fake hashes) are added to produce the do-not-communicate registry in blurry-hashed format.

Testing a registered value against the do-not-communicate registry would always return a match. However, testing an unregistered value returns a false match in a predetermined probability. RUs 106a-106n cannot find new registered values it did not know before by examining the do-not-communicate registry. Furthermore, if RUs 106a-106n attempt to guess registered values (e.g. using a dictionary attack), the false matches would exceed the discovered registered values, making the attack impractical. Furthermore, fake hashes are added to further secure the registry while maintaining the wanted false match probability. Changes in the do-not-communicate registry can be masked by changes in the fake hashes.

Each registered value can be hashed in one of several ways. This is done by, for example, publishing a list of suffixes and appending one of them to each value before hashing it. The use of several hashes allows changing which values generate false matches while still protecting the real values.

Furthermore, another list of hashes (with or without trimming) called an exclude list may be added to the do-not-communicate registry. The do-not-communicate registry does not protect a value whose hash appears in the exclude list. Thus, specific values may be excluded from protection without affecting the real values. For example, if there are 100,000 entries in the registry and the 27 first bits of a SHA-1 are used as hash, then about one out of every 1,000 addresses not in the do-not-communicate registry would erroneously match the do-not-communicate registry. Thus, a dictionary attack with 100,000,000 addresses would result in about 100,000 false matches.

The PLU registries of Registries subsystem 226 can also include a do-not-damage registry of assets (e.g., brand names, customer bases, web sites, IP addresses, or the like) of PLUs 104a-104n. The do-not-damage registry can also be secured by storing the registry data in a blurry-hashed format. For example, the registry may contain a blurry-hashed version of the brand name "Acme's Pills" to warn RUs 106a-106n from selling or advertising "Acme's Pills"without prior consent of Acme, Inc. Another example is having the do-not-damage registry contain a blurry-hashed version of Acme's customer list to thereby warn RUs 106a-106n from performing identity theft on Acme's customers.

When an RU 106a-106 is determined to have ignored a warning 206 or is otherwise in non-compliance, National Guard subsystem 228 can be programmed to deploy and manage a distributed network of combat units to execute one or more active deterrence mechanisms 209. A human operator can evaluate the circumstances and determine whether the conduct of the RUs 106a-106n merits active deterrence.

ADP 102 can leverage the computers of PLU 104a-104n to deploy and execute the active deterrence mechanisms 209 via the combat units. ADP 102 utilizes the National Guard subsystem 228 to manage a distributed network of combat units that are running on top of consumers' machines, complaining on the consumers' behalf to IEs of RUs 106a-106n that have targeted the consumers (i.e., PLUs 104a-104n), and requiring the IEs to use a registry compliance tool to remove any PLU 104a-104n from their Attack lists.

The combat units (deployed from Combat subsystem 222 and managed by National Guard subsystem 228) and the diplomacy channels (of Diplomacy subsystem 220) rely on a communication layer. This set of communication tools covers the requirements of operating and delivering the requested acts, while avoiding attempts from RUs 106a-106n to disrupt said communication. For example, an HTTP service can be utilized to access web sites while frequently switching IP addresses in order to avoid getting blocked by the routers of RUs 106a-106n.

Combat Service Support subsystem 240 includes the infrastructure (e.g., databases, security, etc.) necessary to sustain all elements of the other ADP system components, such as a firewall protecting the components, a database providing a central location for storing data, and like services 208.

Figure 3:
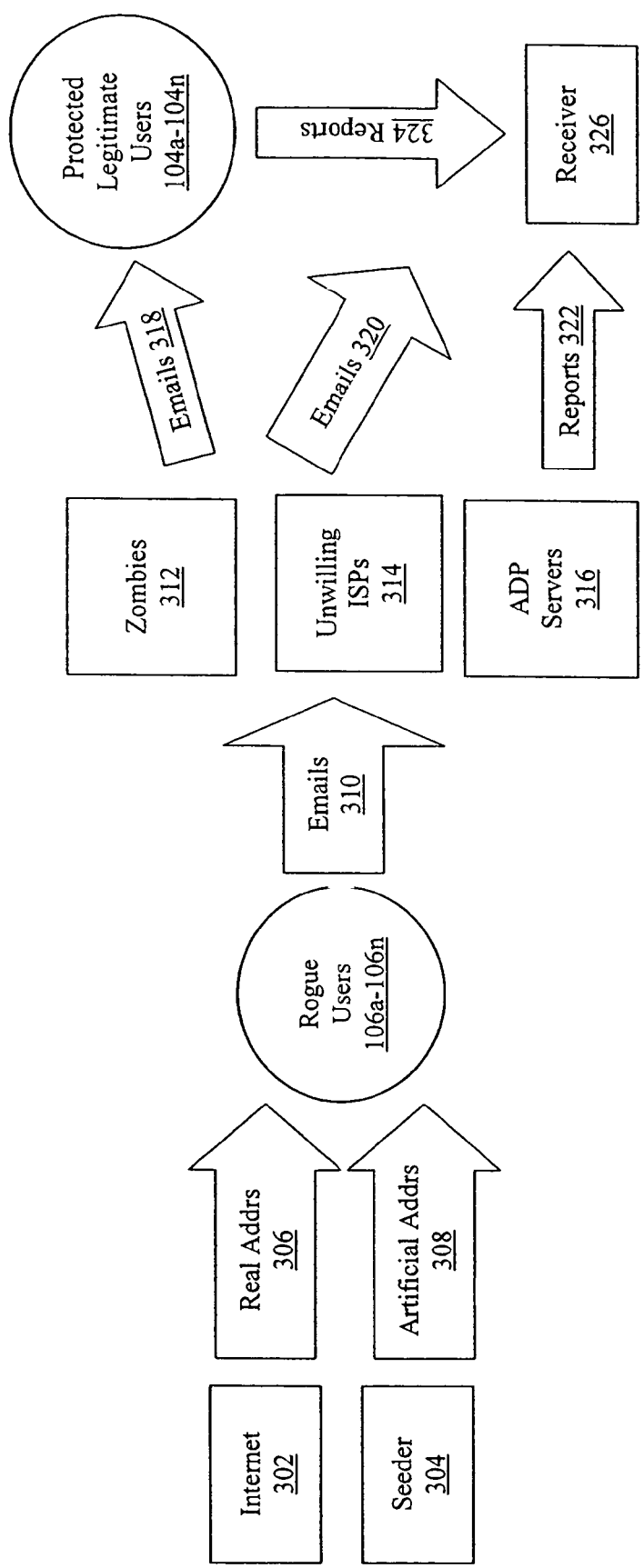
FIG. 3 illustrates the detecting of rogue cyber activity concerning spam message.

FIG. 3 illustrates an operational flow of Collection subsystem 210, according to an embodiment. Artificial addresses 308 (which are associated with artificial PLUs 104a-104n) are seeded by Seeder 302. Artificial addresses 308 are chosen to look as much as possible as real email addresses, and are generated automatically or manually.

FIG. 4 illustrates address seeding in Usenet groups according an embodiment. As shown, an artificial email address (js@dev.example.com) is seeded in a Usenet group ("rec.gambling.poker"). Seeder 304 makes a posting in this Usenet group using a fictitious name and associated email address. RUs 104a-104n are notorious for not respecting the privacy requests of Internet users making such postings, and indiscriminately attempt to harvest addresses from them.

Referring back to FIG. 3, artificial addresses 308 are harvested from the Internet 302 along with real addresses 306 (which are associated with real PLUs 104a-104n) by RUs 106a-106n. RUs 106a-106n send spam email 310 via zombies 312 (i.e., computers of Internet users being used by RUs 106a-106n without their knowledge) and unwilling ISPs 314 (i.e., ISP being used by RUs 106a-106n without their knowledge). Some of the email 318 from zombies 312 and unwilling ISPs 314 reaches real PLUs 104a-104n, but other email 320 from zombies 312 and unwilling ISPs 314 reaches Receiver 326. ADP servers 316 created by ADP 102 as "double agents" receive requests by RUs 106a-106n, and submit evidence reports 322 to Receiver 326 as well. Optionally, the PLUs 104a-104n may submit their own reports 324 generated manually or by installed filters.

RUs 106a-106n can be offered artificial addresses 308 while being warned against using them. The artificial addresses 308 appear to RUs 106a-106n as part of an existing PLU 104a-104n or as a stand-alone PLU 104a-104n, but in effect are dummies used to "draw fire". Once RUs 106a-106n attack the artificial addresses 308, warnings 206 and/or active deterrence mechanisms 209 can be deployed.

For example, "example.com" can be a real PLU 104a-104n. A new sub-domain "dev.example.com" can be created and populated with artificial addresses 308 (e.g., john@dev.example.com). The artificial addresses 308 are seeded in the Internet 302 (e.g., in Usenet) and get harvested by RUs 106a-106n who are spammers. RUs 106a-106n receive warnings 206 against using those artificial addresses 308 (e.g., addresses are included in the do-not-communicate registry) and an active deterrence mechanism 209 is deployed when an RU 106a-106n sends messages to those artificial addresses 308.

In another example, a new domain "do-not-spam-me.com" can be created and populated with artificial addresses 308 (e.g., alice@do-not-spam-me.com). The artificial addresses 308 are seeded in the Internet 302 (e.g., in Usenet) and harvested by RUs 106a-106n who are spammers. RUs 106a-106n receive warnings 206 against using those artificial addresses 308 (e.g., addresses are included in the do-not-communicate registry) and an active deterrence mechanism 209 is deployed when an RU sends messages to those artificial addresses.

Figure 5:
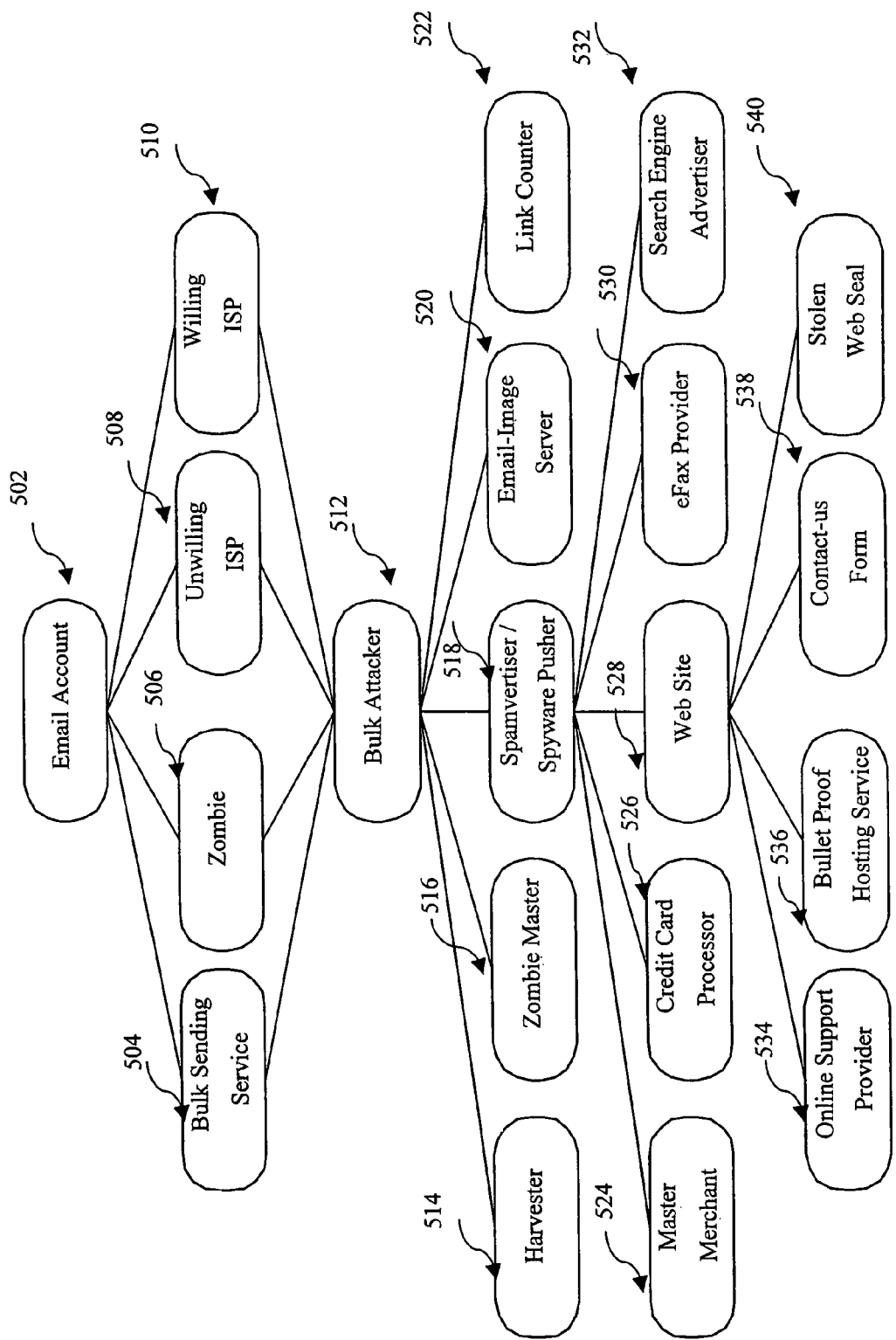
FIG. 5 illustrates various types of involved parties (IEs) related to a spam or spyware pushing activity.

As discussed above, Analysis subsystem 212 extracts all IEs out of the normalized violations 202, and generates target intelligence 203. FIG. 5 shows an example of the different types of IEs that can be detected by Analysis subsystem 212 in spam or spyware pushing activity: a Bulk Attacker 512, which is using a variety of methods (Bulk sending service 504, unauthorized Zombies 506, Willing ISPs 508, and Unwilling ISPs 510) to send messages to the email accounts 502 of PLUs 104a-104n. Bulk Attacker 512 receives email account 502 from a Harvester 514 and the Zombies 506 from a Zombie Master 516. Bulk Attacker 512 may use an Email-Image server 520 to show images inside sent messages, and a Link Counter Service 522 to measure the amount of PLUs 104a-104n, who actually viewed its message. The message itself is advertising the Spamvertiser or Spyware-Pusher entity 518. Spamvertiser or Spyware-Pusher entity 518 has many different partners, such as its Master Merchant 524 (i.e., if there is an explicit or tacit agreement/understanding between the spamvertiser 518 and the merchant 523, they are deemed to be affiliated; otherwise, the merchant may be an unwilling participant), Credit Card Processor 526, eFax Provider 530, Search Engine Advertiser 532, Online Support Provider 534, and Bullet Proof Hosting Service 536. Additionally, the Spamvertised or Spyware-Pusher entity 518 has a Web Site 528 with a Contact Us Form 538 and a Stolen Web Seal 540.

ADP 102 implements an active deterrence mechanism 209 to discourage rogue cyber activity, but clear warnings 206 are important for RUs 106a-106n to understand the reasons that active deterrence was been initiated. For this purpose, all Operational Forces 218 warn either before using an active deterrence mechanism 209 or during the use of an active deterrence mechanism 209. Registries 226 provide means for RUs 106a-106n to avoid PLUs 104a-104n, by allowing RUs 106a-106n to "clean" their Attack Lists from PLUs.

Figure 6:
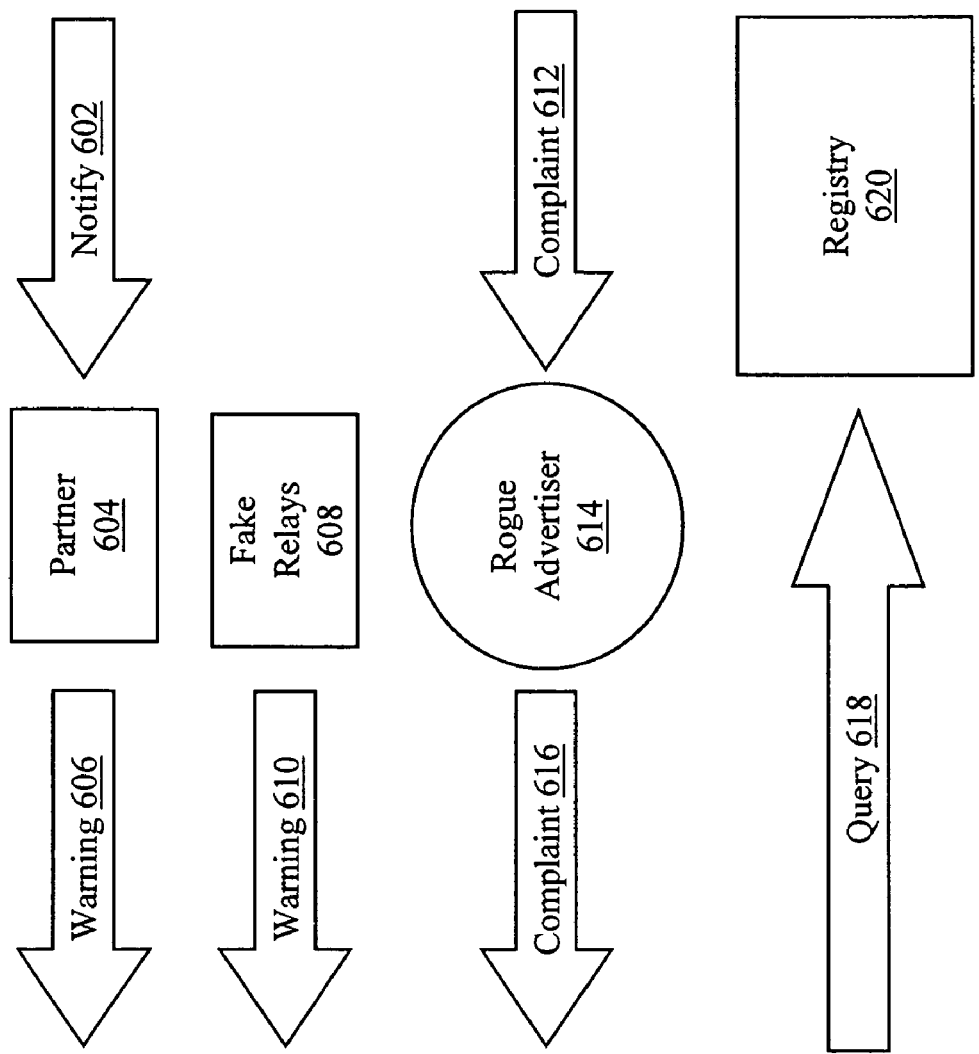
FIG. 6 illustrates the sending of warning signals to rogue users.

FIG. 6 illustrates various types of warnings 206 according to an embodiment of the present invention. When a notification 602 is sent to a partner 604 of an RU 106a-106n, partner 604 is asked to pass along a warning 606 to the RU 106a-106n, itself. When the RU 106a-106n uses a fake relay 608, a warning 610 is embedded within the communication protocol with the RU 106a-106n. When a complaint 612 is sent to a rogue advertiser 614 (e.g., Spamvertiser 518), the complaint 612 puts the blame on the RU 106a-106n (e.g., Bulk Attacker 512) for targeting PLUs 104a-104n, causing the advertiser 614 to send a complaint 616 to the RU 106a-106n. Of course, all those warnings (e.g., 602, 606, 610, 612, and 616) and any resulting active deterrence mechanisms 209 can be easily avoided should the RU 106a-106n send a query 618 to a PLU registry 620 and remove the PLUs 104a-104n from its Attack List.

As discussed above, the active deterrence mechanisms 209 can take many forms. FIG. 7 is an example of a complaint 612 that can be sent to a rogue advertiser 614 (e.g., Spamvertiser 518). Combat subsystem 222 would send such complaints 612, for example, in a proportional number to the amount of rogue cyber activities 201 targeting PLUs 104a-104n.

Figure 8:
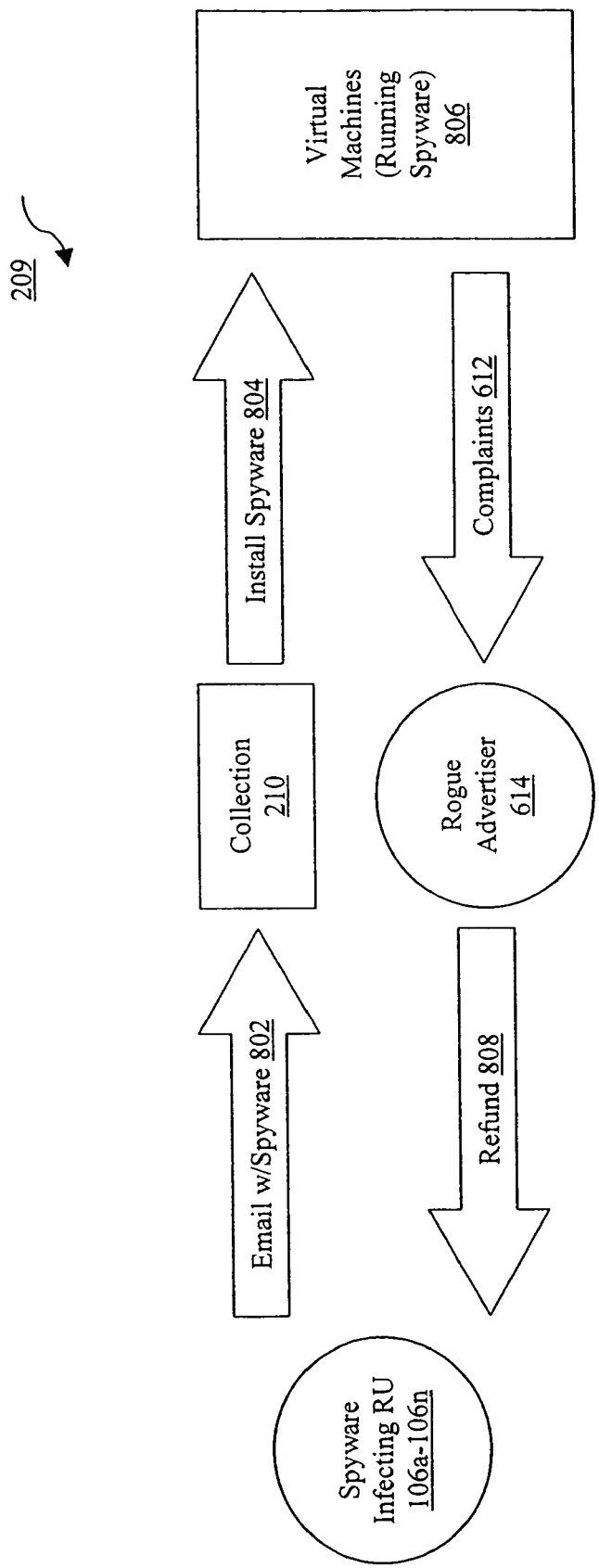
FIG. 8 illustrates active deterrence of advertisers that utilize spyware.

FIG. 8 illustrates another example of active deterrence mechanism 209. When a spyware infector RU 106a-106n sends out an email 802 containing an invitation to a spyware-carrier web site (e.g., Web Site 528) to a PLU 104a-104n, Collection subsystem 210 would download and install such spyware 804 onto a virtual machine 806. All rogue advertisements originating from the spyware 804 would be used as a basis for complaints 612 by Combat subsystem 222 to the rogue advertisers 614 mentioned in the advertisement, causing those advertisers 614 to ask for a refund 808 from the spyware infector RU 106a-106n, thus actively deterring both the spyware infector RU 106a-106n and rogue advertisers 614.

Figure 9:
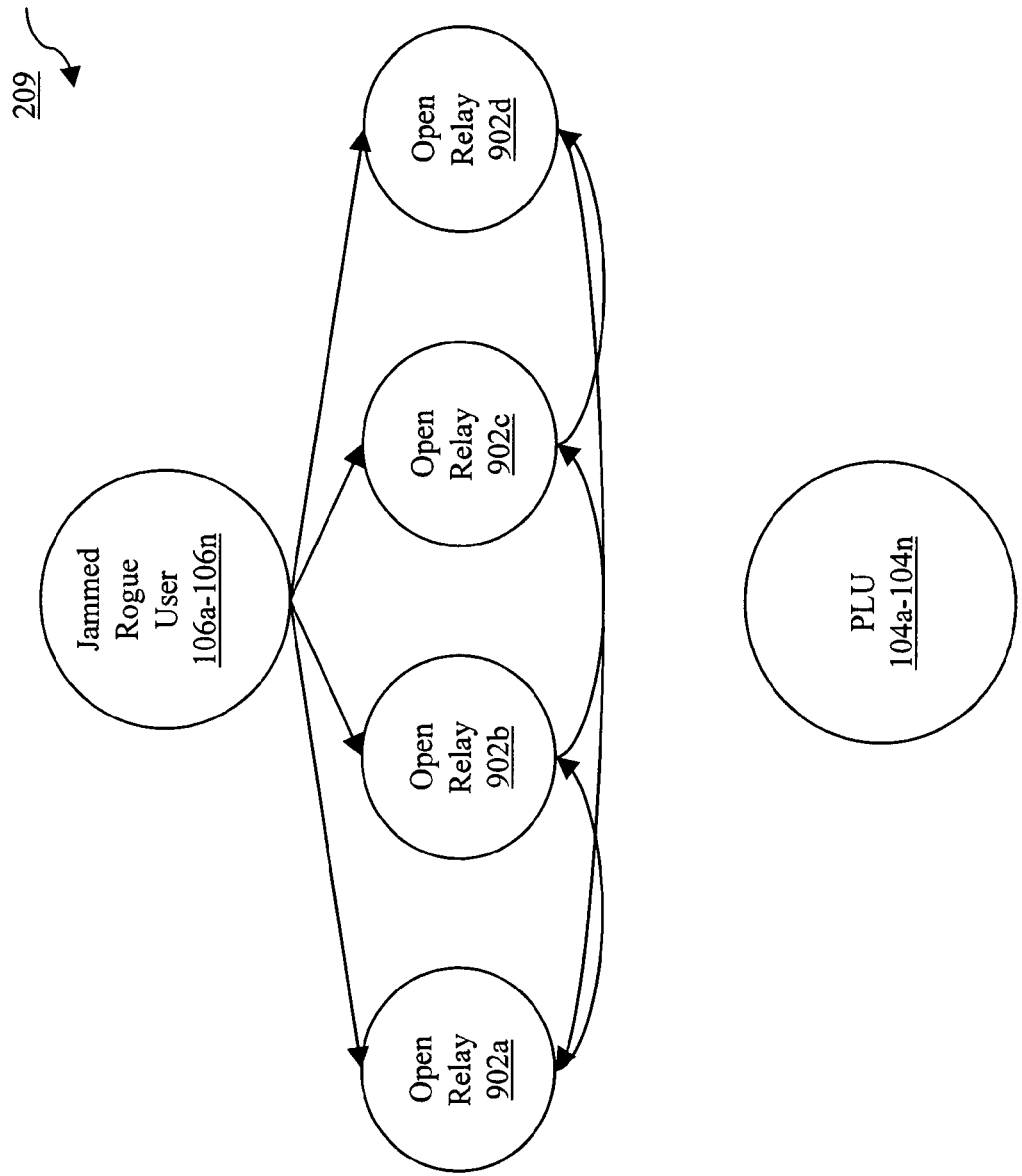
FIG. 9 illustrates active deterrence utilizing open relay chaining.

FIG. 9 illustrates another example of active deterrence mechanism 209. As shown, an RU 106a-106n attempts to leverage several SMTP open relays or open proxies (shown as open relays 902a-902d) to provide anonymity to the trafficking of its rogue cyber activity 201 to a PLU 104a-104n. In response, ADP 102 deploys an active deterrence mechanism 209 to protect the identity (e.g., IP addresses) of the targeted PLU 104a-104n. The ADP-protected, PLU 104a-104n is contacted by open relay 902a and asked to provide the IP address of the SMTP server for the PLU 104a-104n. The PLU 104a-104n does not return the SMTP server's IP address, but rather returns IP address for open relay 902b. This process continues for open relay 902b that receives the IP address for open relay 902c as the SMTP server for the PLU 104a-104n, and the process continues for open relay 902c that receives the IP address for open relay 902d. Finally, open relay 902d is given the IP address of open relay 902a to thereby close the loop. The open relays 902a-902d are now chained, sending SMTP messages to one another in an endless loop, thus shielding the ADP-protected, PLU 104a-104n.

Figure 10:
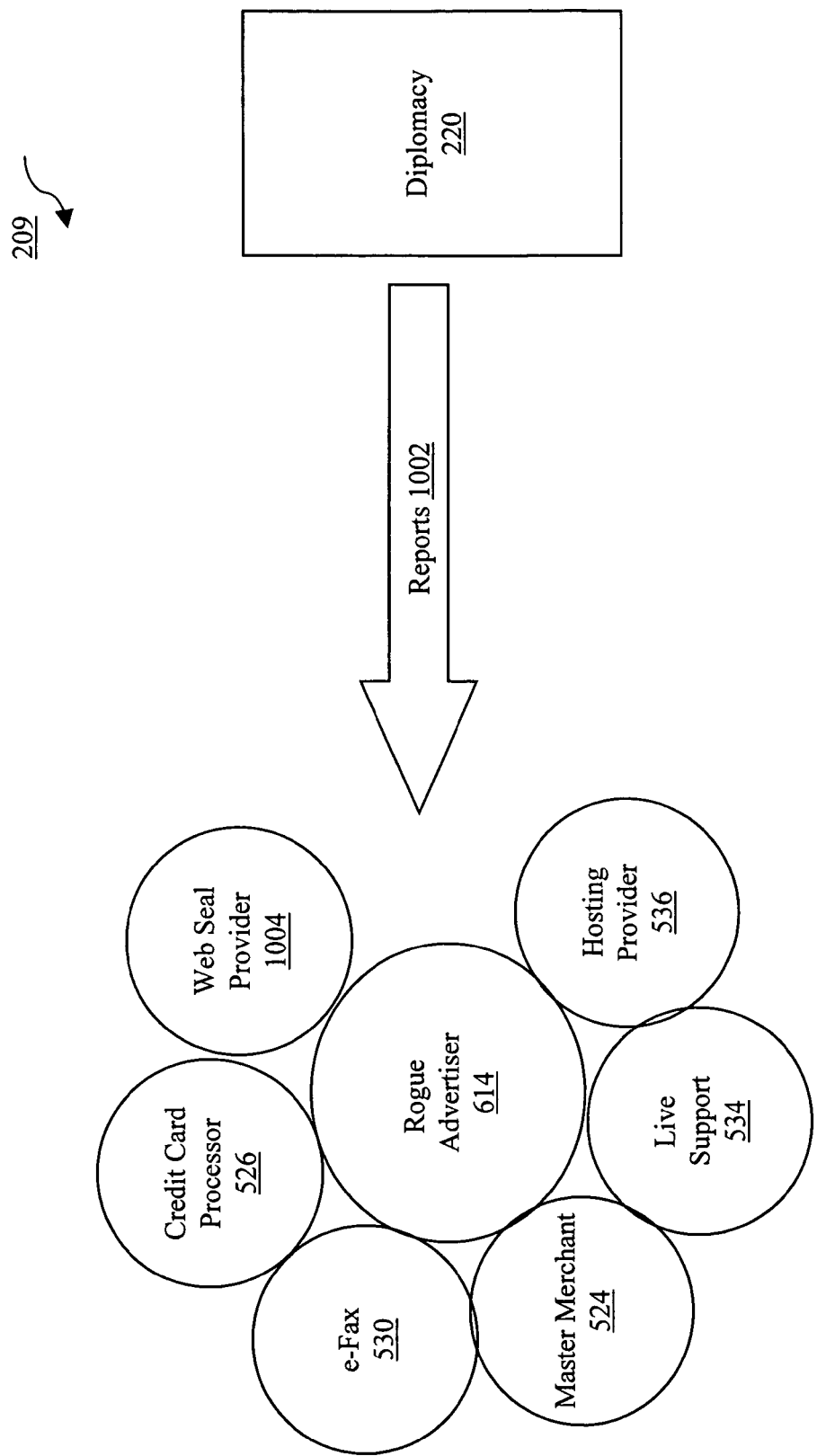
FIG. 10 illustrates active deterrence utilizing business partners of a rouge advertiser.

FIG. 10 illustrates another example of active deterrence mechanism 209. Diplomacy subsystem 220 issues a periodic report 1002 (such as, reports 322 described with reference to FIG. 3) of all business partners (such as, the IEs described with reference to FIG. 5), whether the business partners are willing or not, of Rogue Advertiser 614 (e.g., Spamvertiser 518). As shown in FIG. 10, the business partners include the Hosting Provider 536, Live Support Provider 534, Master Merchant 524 (e.g., Playboy.com), e-Fax provider 530, and Credit Card Processor 526. In addition if Rogue Advertiser 614 is displaying a web seal without being entitled to do so, the Web Seal Provider 1004 is contacted about this abuse.

Figure 11:
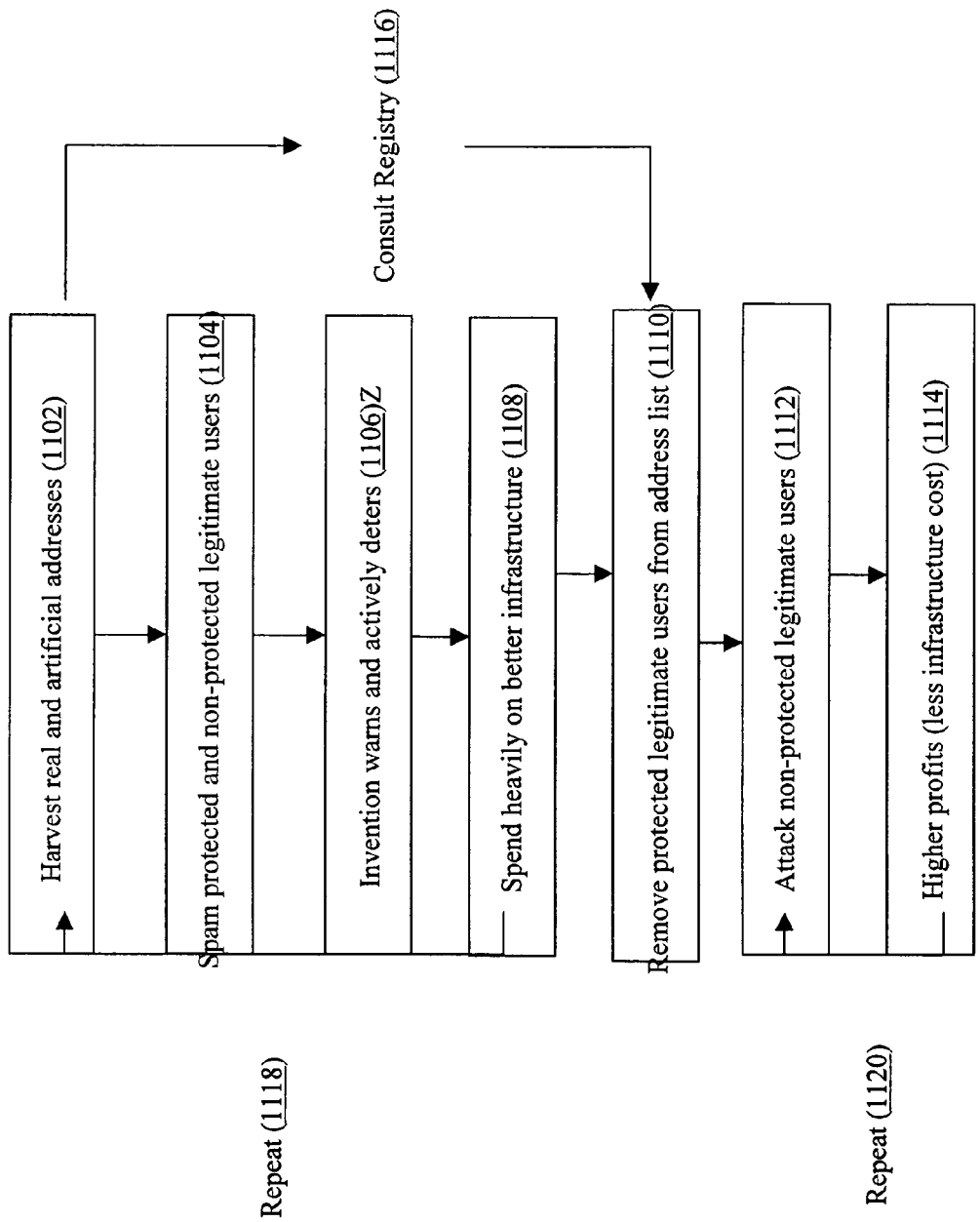
FIG. 11 illustrates the learning process of a rogue user.

FIG. 11 shows an example of a learning process for RUs 106a-106n as it related to results of spamming PLUs 104a-104n. At step 1102, an RU 106a-106n harvests real email addresses (e.g., real addresses 306) along with artificial email addresses (e.g., artificial addresses 308). Some of the real addresses belong to PLUs 104a-104n and some to unprotected legitimate users. At step 1104, the RU 106a-106n spams all harvested addresses (e.g., real addresses 306, and artificial addresses 308). At step 1106, spam reaching PLUs 104a-104n triggers warnings 206 and active deterrence mechanisms 209, and as a result at step 1108, RU 106a-106n must invest in better communications infrastructure.

Active deterrence 209 is repeated at step 1118 until the RU 106a-106n removes all PLUs 104a-104n from its Attack lists at step 1110. After an initial encounter with ADP 102, and once deterrence has been established against the RU 106a-106n, RU 106a-106b can consult the PLU registries to avoid spamming PLUs 104a-104n at step 1116.

As indicated at step 1120, the RU 106a-106n may continue to spam unprotected legitimate users at step 1112, without any interference from ADP 102 and with the anticipation of realizing a greater return on investment at step 1114.

Figure 12:
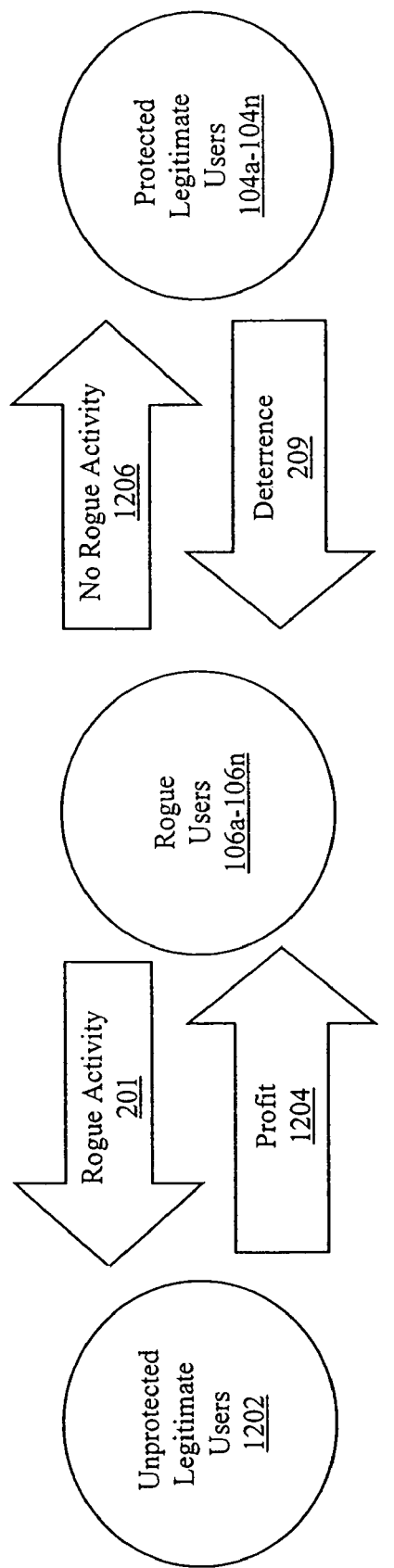
FIG. 12 illustrates the conduct of a rogue user following the successful implementation of active deterrence.

FIG. 12 shows the behavior of an RU 106a-106n upon execution of ADP 102. RU 106a-106n would prefer to target their rogue cyber activities 201 at unprotected legitimate users 1202, hoping to gain economical profit 1204. However, a RU 106a-106n would avoid PLUs 104a-104n, initiating no rogue cyber activity 1206 as an active deterrence mechanism 209 has already been successfully deployed and executed.

The methodologies and techniques of ADP 102 can be offered to PLUs 104a-104n, as a managed service, on a subscription basis, for individual consumers and companies wishing to deter RUs 106a-106n from targeting them. For example, PLUs 104a-104n may run an automated opt-out software application to have their email addresses listed for free in the registry, and/or PLUs 104a-104n may receive an alert before entering a web site controlled by a RU 106a-106n along with a redirect advertisement. Companies may list their PLUs in ADP's PLU registries for an annual subscription and receive rogue cyber activity 201 detection and active deterrence 209 services. Consumers may list their private email addresses as PLUs 104a-104n for free, in exchange for making a portion of their computing resources and network bandwidth available for the ADP distributed detection and active deterrence platform 102. A subscription for search engine protection can also be offered against illegal modification of search results by spyware running on consumers' machines.

System 100 provides a community of participants (i.e., PLUs 104a-104n) who cooperate to collect data about rogue activities against PLUs 104a-104n; analyzes detected rogue cyber activities 201 to determine the IEs, and increases the operating costs of IEs by acting against the detected IEs with one or more active deterrence mechanisms 209. The active deterrence mechanisms 209 can involve reaching out to a seed population of participants and having each participant attempt to recruit more participants.

System 100 offers effective deterrence without breaking applicable laws. The methodologies and/or techniques of system 100 draw their effectiveness from unchangeable traits of rogue cyber activities 201. For example, complaining to Spamvertiser 518 (e.g., rogue advertiser 614) only once for all of the PLUs 104a-104n who received a spam message is legal, but not effective as an active deterrence method. However, spammers (e.g., Bulk Attackers 512 or RU 106a-106n) tend to send millions of spam messages (e.g., rogue cyber activity 201). Therefore, large amounts of spam messages from the same Spamvertiser 518 can be received by different PLUs 104a-104n, and large amounts of opt-out requests (e.g., complaint 612) can then be legally generated by said PLUs 104a-104n according to the CAN-SPAM Act, creating a very effective legal active deterrence tool.

System 100 offers a reduction in the amount of rogue cyber activities 201 without adversely affecting desired traffic to PLUs 104a-104n. Methodologies and/or techniques are provided for deploying artificial PLUs 104a-104n with high similarity to real PLUs 104a-104n via the managed services of system 100, and then detecting and actively deterring only rogue cyber activities 201 impacting those artificial PLUs 104a-104n. Therefore, RUs 106a-106n targeting the real PLUs 104a-104n would also target the artificial PLUs 104a-104n, experience active deterrence mechanism 209, and have no choice but to avoid targeting both real and artificial PLUs 104a-104n. However, since no knowledge of or connection with the traffic of real PLUs 104a-104n is required, it can be guaranteed that system 100 would not to affect this traffic to real PLUs 104a-104n. For example, reduction in incoming spam for real users (e.g., PLU 104a-104n) of corporation Example, Inc. can be done by adding many artificial email accounts to Example.com. These artificial email addresses would be offered to spammers (e.g., RUs 106a-106n) via seeding, and when the artificial addresses are spammed, active deterrence mechanism 209 and warning 206 can be deployed to deter the spammer (e.g., RU 106a-106n) from spamming any account belonging to Example, Inc. Spammers (e.g., 106a-106n) would have to remove all accounts of Example, Inc. to stop the active deterrence mechanisms 209 of system 100. Therefore, a reduction in spam reaching real users (e.g., 104a-104n) would be achieved without impacting (e.g., reducing) the desired traffic to real users (e.g., 104a-104n) of Example, Inc. Therefore, Example, Inc. can be assured there will be no chance of incorrectly blocking its user's desired traffic (e.g., false positive) while providing spam protection of system 100.

System 100 offers a reduction in the amount of rogue cyber activities 201 affecting customers' internal activities without requiring an installation in their own networks or any tuning of any equipment or software. As discussed, rogue cyber activity 201 can be detected and actively deterred without active cooperation from the PLUs 104a-104n via a managed service of system 100. Therefore, since no cooperation from the PLUs 104a-104n is required, no installation and tuning are required. For example, a reduction in incoming spam for real users of a reputable corporation such as Example, Inc. can be achieved by detecting spam messages targeting Example, Inc. via authorized, ADP servers deployed on a global basis and used for active deterrence accordingly. Spammers would have to remove all accounts of Example, Inc. to cease implementation of the active deterrence mechanisms 209. Therefore, a reduction in spam reaching real users can be achieved without requiring any cooperation from Example, Inc. Therefore, Example, Inc can be assured that installation and tuning are not required while providing spam protection using the invention.

System 100 offers a reduction in the amount of rogue cyber activities 201 with a near zero implementation cost for each new customer. Upon successful execution of an active deterrence mechanism 209 against RUs 106a-106n, new customers can be added to the PLU registries and distributed to the RUs 106a-106n so that they can remain in compliance. This can be achieved without performing any additional work (e.g., without attempting to detect rogue cyber activity 201 targeting the new customers). Since the complying RUs 106a-106n are already avoiding all PLUs 104a-104n listed in the PLU registries, these RUs 106a-106n would avoid any newly added PLUs 104a-104 as well. For example, after the do-not-communicate registry is checked by virtually all spammers in the world, reduction in incoming spam for a new customer, Example, Inc., can achieved by simply adding "*@Example.com" to the registry. Since spammers already avoid all addresses within the PLU registry, the spammers would avoid Example, Inc., also. Therefore, reducing spam for a new customer, Example, Inc., has been achieved at the cost of adding an entry to the PLU registry.

System 100 can provide a reduction in the harmful effects and/or maintenance costs of conventional defensive measures against rogue cyber activities 201 without reducing overall protection against rogue cyber activity 201. Upon implementation of ADP 102, PLUs 104a-104n can set the sensitivity levels of their conventional defensive measures to lower a level. Since most harmful effects of defensive measures and maintenance cost are produced at higher sensitivity levels, this would reduce the harmful effects and maintenance costs. Furthermore, since the amount of rogue cyber activities 201 would be substantially reduced by actively deterring RUs 106a-106n, the overall protection (compared to the protection level of convention defensive measures alone) would be, at a minimum, the same or better. For example, after implementing ADP 102 to successfully deter spammers targeting Example, Inc., only a small fraction of spam messages, compared to pre-deterrence numbers, is sent to Example's users. Example, Inc. could thereafter be asked to reduce the sensitivity level of its spam filters, thus preventing the spam filters from erroneously blocking legitimate emails, without increasing the number of spam messages actually reaching users. Additionally, maintenance cost are reduced because its IT staff do not have to constantly tune the spam filter to achieve peak performance, nor do users have to search their bulk folder for incorrectly blocked legitimate messages.

System 100 can provide enforceable PLU registries and PLU identifying marks to national and international authorities or governmental agencies. This would provide the authorities or agencies with means for managing the PLU registries and PLU identifying marks, detecting rogue cyber activity 201 aimed at PLUs 104a-104n appearing in the PLU registries and displaying PLU identifying marks, and actively deterring RUs 106a-106n and warning them against future attacks on the PLUs 104a-104n. An enforceable, national do-not-spam PLU registry could be also offered and/or sold to authorities or governmental agencies in charge of protecting consumers in different countries.

System 100 can lower the costs associated with offering a spam deterrence service. For instance, consumers can be offered an opportunity to become PLUs 104a-104n for free, in exchange for actively complaining against RUs 106a-106n and other IEs. For example, consumers could be allowed to add their personal email addresses to a do-not-spam PLU registry in return for running a software application from ADP 102 that actively deters spammers who violated the registry.

System 100 can generate revenues from its active deterrence activities. Consumers could be offered a software application from ADP 102 that warns against rogue cyber activities 201 and displays advertisement for competing products and/or service. Revenues can be generated by selling the competing advertisement space to reputable companies. For example, consumers could be warned before viewing spam sites advertising a particular drug, and displayed an advertisement from reputable virtual drug stores for the same product.

System 100 can prove its own value to potential customers. For instance, system 100 enables a consumer to add one or all of their PLUs 104a-104n to the PLU registries or display a PLU identifying mark on one or all of their PLUs 104a-104n. Since RUs 106a-106n respect the PLU registries and PLU identifying marks, a potential customer would notice a reduction in rogue cyber activity 201. For example, a chief-security-office of a potential customer may add her own email address to the PLU registry and notice a dramatic decline in her incoming spam volume.

System 100 can create effective PLU registries and PLU identifying marks that are required by customers before system 100 has a first customer. For instance, artificial PLUs 104a-104n can be established and used to successfully deploy an active deterrence mechanism against RUs 106a-106n. For example, a do-not-spam PLU registry can be bootstrapped by creating 10,000,000 artificial email addresses, registering the artificial addresses in a PLU registry, making the artificial addresses available to spammers via seeding, and then deploying an active deterrence mechanism 209 to protected the artificial addresses listed in the PLU registry or represented by the PLU identifying marks.

Other business model and technical aspects would become apparent to those skilled in the relevant art(s) in view of the teachings of the present disclosure. FIGS. 1-12 are conceptual illustrations allowing an explanation of the present invention. It should be understood that various aspects of the embodiments of the present invention could be implemented in hardware, firmware, software, or a combination thereof. In such an embodiment, the various components and/or steps would be implemented in hardware, firmware, and/or software to perform the functions of the present invention. That is, the same piece of hardware, firmware, or module of software could perform one or more of the illustrated blocks (i.e., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by a processor to cause the processor to perform the functions of the invention as described herein. In this document, the terms "machine readable medium," "computer program medium" and "computer usable medium" are used to generally refer to media such as a removable storage unit (e.g., a magnetic or optical disc, flash ROM, or the like), a hard disk, or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the art.

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A computer-implemented method of protecting a plurality of devices within a communications system from receiving unsolicited electronic messages from a rogue source, the method comprising:

detecting transmission of an unsolicited electronic message toward a protected device;

determining a source of the unsolicited electronic message and whether or not the source is a rogue source; and if the detected source is determined to be a rogue source, forwarding to the protected device a sequence of commands that, when executed, (a) initiates an electronic session with the rouge source to register an opt-out request, and (b) requests the rogue source to install a registry compliance tool that enables execution of commands that remove a protected electronic address from an electronic mailing list residing at the source.

2. The method of claim 1, wherein said detecting comprises:

receiving a request from a protected device that identifies the unsolicited electronic message.

3. The method of claim 1, wherein said detecting comprises:

evaluating electronic communications with an automated deterrence platform (ADP) device to detect the unsolicited electronic message, wherein the ADP device is configured to receive unsolicited electronic messages.

4. The method of claim 1, wherein said determining comprises detecting a merchant that promotes a service or product identified in the unsolicited electronic message.

5. The method of claim 1, wherein said determining comprises detecting a web site associated with the contents of the unsolicited electronic message.

6. The method of claim 5, wherein said determining comprises detecting an affiliate of the web site, said affiliate comprising one or more of: an Internet registrar, a network service provider, a site host, a credit card clearance service, a payment service, and an e-commerce solution provider.

7. The method of claim 1, wherein said forwarding comprises:

forwarding a sequence of commands that, when executed, impedes the source from redirecting the electronic session to an alternate device or application.

8. The method of claim 1, wherein said forwarding comprises:

forwarding a sequence of commands that, when executed, sends to the rogue source a series of HTTP requests having a predetermined time delay between each HTTP request to mimic a human user operating a browser application and avoid being filtered by the rogue source.

9. The method of claim 1, wherein said forwarding comprises:

forwarding the sequence of commands to each of the plurality of devices, wherein each of the plurality of devices is to execute the sequence of commands to initiate a distinct electronic session with the rogue source and register a distinct opt-out request.

10. The method of claim 1, wherein said forwarding comprises:

forwarding a sequence of commands that, when executed, registers a plurality of opt-out requests from the protected device.

11. The method of claim 1, further comprising:

populating a compliance registry with at least one electronic address associated with the protected device.

12. The method of claim 11, further comprising:

creating one or more artificial electronic addresses that do not enable communications with the protected device.

13. The method of claim 12, further comprising:
populating the compliance registry with the one or more artificial electronic addresses.

14. The method of claim 12, further comprising:
associating the one or more artificial electronic addresses with an automated deterrence platform (ADP) device, wherein the ADP device is to receive unsolicited electronic messages at the one or more artificial electronic addresses.

15. The method of claim 11, further comprising:
converting each electronic address in the compliance registry to an encoded format.

16. The method of claim 11, wherein said forwarding comprises:
forwarding a sequence of commands that, when executed, requests the rogue source to remove an electronic address identified in the compliance registry from an electronic mailing list residing at the source.

17. A computer program product comprising a computer useable medium having computer readable program code functions embedded in said medium for causing a computer to protect a plurality of devices within a communications system from receiving unsolicited electronic messages from a rogue source, comprising:
a first computer readable program code function that causes the computer to initiate an electronic session with the rogue source;
a second computer readable program code function that causes the computer to send to the rogue source one or more commands to register an opt-out request; and
a third computer readable program code function that causes the computer to send a registry compliance tool that enables the execution of commands to remove a protected electronic address from an electronic mailing list residing at the rouge source.

18. The computer program product according to claim 17, wherein the second computer readable program code function comprises:
computer readable program code function that causes the computer to send to the rogue source a series of HTTP requests having a predetermined time delay between each HTTP request to mimic a human user operating a browser application and avoid being filtered by the rogue source.

19. The computer program product according to claim 17, wherein the third computer readable program code function comprises:
a computer readable code function that causes the computer to access a request from the rouge source to receive the registry compliance tool.

20. The computer program product according to claim 17, further comprising:
a fourth computer readable program code function that causes the computer to impede the rogue source from redirecting the electronic session to an alternate device or application.

21. A hardware system for protecting a plurality of communications devices from receiving unsolicited electronic messages from a rogue source, the hardware system comprising:
a compliance registry populated with a plurality of electronic addresses for receiving an electronic message at corresponding communications devices;
detecting means for detecting transmission of an unsolicited electronic message toward at least one of the plurality of communications devices;
an operations center for detecting a source of the unsolicited electronic message and evaluating a threat level associated with the source; and
a sequence of commands that, when executed, (a) controls the operations or functions of one or more of the plurality of communications devices to initiate a plurality of electronic sessions with the source to register a plurality of opt-out requests, if the source is associated with a predetermined threat level, and (b) controls the operations or functions of at least one of the plurality of communications devices to request the source to install a registry compliance tool that enables the execution of commands to remove an electronic address delineated in the compliance registry from an electronic mailing list residing at the source.

22. The hardware system of claim 21, wherein the compliance registry is further populated with artificial addresses associated with at least one artificial protected legitimate user (PLU).

23. The hardware system of claim 22, wherein said detecting means comprises:
means for receiving a request from at least one of the plurality of communications devices that identifies the unsolicited electronic message.

24. The hardware system of claim 22, wherein said detecting means comprises:
means for evaluating electronic communications with an automated deterrence platform (ADP) device to detect the unsolicited electronic message, wherein the ADP device is configured to receive unsolicited electronic messages at artificial electronic addresses.

25. A computer-implemented method of protecting a plurality of communications devices from receiving unsolicited electronic messages from a rogue source, the method comprising:
populating a compliance registry with a plurality of electronic addresses,
said electronic addresses adapted to receive an electronic message at the plurality of communications devices corresponding to the plurality of electronic addresses;
detecting transmission of an unsolicited electronic message toward at least one of the plurality of communications devices;
evaluating a threat level associated with a source of the unsolicited electronic message; and
forwarding, to one or more of the plurality of communications devices, a sequence of commands that, when executed, (a) controls the operations or functions of the one or more communications devices to initiate a plurality of electronic sessions between the source and the one or more communications devices to thereby register a plurality of opt-out requests, if the source is associated with a predetermined threat level, and (b) requests the rogue source to install a registry compliance tool that enables execution of commands that remove a protected electronic address from an electronic mailing list residing at the source.

26. The computer-implemented method of claim 25, wherein said evaluating comprises at least one of:
analyzing a quantity of unsolicited electronic messages transmitted from the source toward at least one of the plurality of communications devices;
consulting at least one of a listing of reputable merchants or a listing of disreputable merchants;
collecting intelligence from a search engine;

evaluating electronic communications between the source and an automated deterrence platform (ADP) device configured to receive unsolicited electronic messages; or requesting the source to cease electronic communications with the plurality of communications devices and waiting a grace period for compliance.

27. The computer-implemented method of claim 25, further comprising:

performing at least one of the following prior to the execution of said forwarding:

contacting the source to request the source to cease sending electronic messages to the at least one communications device detected during said detecting;

contacting the source to request the source to cease sending electronic messages to all of the plurality of communications devices;

contacting an affiliate of the source to request the affiliate to request the source to cease further electronic communications with the plurality of communications devices, wherein the affiliate comprises one or more of: an Internet registrar, a network service provider, a site host, a credit card clearance service, or an e-commerce solution provider; or contacting the affiliate of the source to request the affiliate to terminate further relations with the source.

* * * * *